United States Patent
Hayashi et al.

(10) Patent No.: US 8,222,182 B2
(45) Date of Patent: Jul. 17, 2012

(54) ANION ADSORBING CARBON MATERIAL, AS WELL AS MANUFACTURING METHOD AND MANUFACTURING FACILITIES FOR SAME

(75) Inventors: Satsohi Hayashi, Tsuyama (JP); Riei Yokoyama, Tsuyama (JP)

(73) Assignee: Nisshoku Corporation, Okayama (JP)

( * ) Notice: Subject to any disclaimer, the term of this patent is extended or adjusted under 35 U.S.C. 154(b) by 0 days.

(21) Appl. No.: 11/923,429

(22) Filed: Oct. 24, 2007

(65) Prior Publication Data
US 2008/0139384 A1 Jun. 12, 2008

Related U.S. Application Data

(62) Division of application No. 10/581,578, filed on Dec. 26, 2006.

(30) Foreign Application Priority Data

| Dec. 5, 2003 | (JP) | 2003-407705 |
| Mar. 15, 2004 | (JP) | 2004-072362 |
| Mar. 16, 2004 | (JP) | 2004-074074 |
| Jun. 30, 2004 | (JP) | 2004-194432 |
| Aug. 25, 2004 | (JP) | 2004-244656 |

(51) Int. Cl.
*C01B 31/08* (2006.01)
(52) U.S. Cl. .......... 502/417; 252/184; 502/418
(58) Field of Classification Search .......... 252/184; 423/441–442; 502/416–418, 423, 426, 427
See application file for complete search history.

(56) References Cited

U.S. PATENT DOCUMENTS

| 3,168,485 A * | 2/1965 | Knobloch et al. | 502/426 |
| 3,835,064 A * | 9/1974 | Shinomiya et al. | 502/425 |
| 4,937,223 A * | 6/1990 | Yamaguchi | 502/427 |
| 5,614,459 A * | 3/1997 | Mondragon et al. | 502/417 |
| 6,495,730 B1 | 12/2002 | Konishi et al. | |
| 2002/0010093 A1 | 1/2002 | Monereau et al. | |
| 2002/0177520 A1 * | 11/2002 | Tanaka et al. | 502/150 |
| 2003/0179537 A1 * | 9/2003 | Tanaka et al. | 361/502 |

FOREIGN PATENT DOCUMENTS

| CN | 1040185 A | 3/1990 |
| CN | 2469321 Y | 1/2002 |
| EP | 1103523 A2 * | 5/2001 |
| JP | 48-93591 | 12/1973 |

(Continued)

OTHER PUBLICATIONS

Abstracts of the Annual Meeting of Japanese Society of Soil Science and Plant Nutrition, vol. 43, Apr. 1997, p. 179 w/English Translation.

(Continued)

*Primary Examiner* — Stanley Silverman
*Assistant Examiner* — Brian Walck

(57) ABSTRACT

A manufacturing method is provided for producing a carbon material adsorbing nitrate nitrogen, nitrate nitrogen or a fluoride ion through an ion exchange with a chloride ion. Plant material can be impregnated with a calcium chloride solution. Subsequently, the plant material can be carbonized to enable the plant material to support chloride ions that can provide ion exchanging capability with nitrite nitrogen, nitrate nitrogen, and a fluoride ion via calcium. The temperature of the carbonization permits the deposits of a calcium chloride compound within 2% to 25% by weight as a functional group in a carbonized material having ash components.

3 Claims, 16 Drawing Sheets

FOREIGN PATENT DOCUMENTS

| | | |
|---|---|---|
| JP | 49-30141 | 3/1974 |
| JP | 49-54151 | 5/1974 |
| JP | 51-3975 | 1/1976 |
| JP | 52-009974 | 1/1977 |
| JP | 52-16363 | 2/1977 |
| JP | 52-34260 | 3/1977 |
| JP | 54-033293 | 3/1979 |
| JP | 56-160312 | 12/1981 |
| JP | 63-129007 | 6/1988 |
| JP | 01-308818 | 12/1989 |
| JP | 03-146412 | 6/1991 |
| JP | 04-122490 | 4/1992 |
| JP | 05-098942 | 4/1993 |
| JP | 05-247470 | 9/1993 |
| JP | 06-127912 | 5/1994 |
| JP | 07-047269 | 2/1995 |
| JP | 09-225454 | 9/1997 |
| JP | 09-314131 | 12/1997 |
| JP | 10-017390 | 1/1998 |
| JP | 11-106751 | 4/1999 |
| JP | 2000-211910 | 8/2000 |
| JP | 2001-2323894 | 8/2001 |
| JP | 2002-088373 | 3/2002 |
| JP | 2002-104816 | 4/2002 |
| JP | 2003-026408 | 1/2003 |

OTHER PUBLICATIONS

Riei Yokoyama et al. Adsorption of Fluorine and Nitrate Ions by Charcoal, p. 209, with English translation, Japan Society on Water Environment; Mar. 17-19, 2004.

Chinese Application No. 200710161740.3 Office Action dated Dec. 10, 2010, 6 pages with partial English translation.

\* cited by examiner (A)

(B)

ANION ADSORBING CARBON MATERIAL, AS WELL AS MANUFACTURING METHOD AND MANUFACTURING FACILITIES FOR SAME

RELATED APPLICATIONS

This application is a divisional application from U.S. patent application Ser. No. 10/581,578 filed on Dec. 26, 2006.

BACKGROUND OF THE INVENTION

1. Field of the Invention

This invention relates to an anion adsorption carbon material for adsorbing anions such as nitrate ions and fluoride ions, as well as a manufacturing method and manufacturing facilities for the same.

2. Description of Related Art

Contamination of water quality and soil by heavy metals, agricultural chemicals and organochlorine compounds has become a problem in that it destroys the environment. Though these harmful substances can be adsorbed and removed with adsorbents such as activated carbon and a zeolite, it is presently difficult to treat nitrate nitrogen, nitrite nitrogen, fluorine, arsenic and cyan which exist in the form of anions with adsorbents.

Nitrate nitrogen and nitrite nitrogen are usually included in fertilizers used in tea fields, turfs for golfing and the like, and have become a factor in ground water contamination, which is presently a large problem. This is because nitrate ions and nitrite ions have a negative charge and do not become an insoluble salt by combining with other chemical substances, and therefore, very easily wash out from negatively charged soil. Thus, although measures against the above described problem are frequently required, there are practical limitations, such that anaerobic conditions are required in biological treatment where, for example, denitrifying bacteria are used to remove nitrate ions and nitrite ions, and in addition, there are similar limitations with other methods. Thus, no completely effective measures have been found. On top of this, recently, it has come to be believed that nitrate nitrogen and nitrite nitrogen are possible environmental hormones.

In addition, fluorine is included in wastewater from semiconductor factories, glass factories, plating factories and the like, and although a method for adding calcium compounds to fluorine in industrial wastewater so that the fluorine can be removed in the form of calcium fluorine has been used, further installation of adsorption towers having an anion exchange resin for active alumina and fluorine is required, thereby raising the cost. In addition, expensive dedicated anion exchange resins are required in order to meet governmental regulations such as a Japanese environmental standard of 0.8 mg/L. Furthermore, expensive anion exchange resins are separately required for treating arsenic, cyan and the like which are also found in industrial wastewater and ground water.

As described above, no inexpensive material for adsorbing anions including nitrate ions as described above have been found at present, and therefore, contamination by these anions tend to spread, and once the environment is contaminated by anions as described above, high cost becomes necessary to restore it, see Japanese Unexamined Patent Publication H10 (1998)-165824

SUMMARY OF THE INVENTION

Therefore, inexpensive and environmentally friendly anion adsorbing materials are needed. Though charcoal, which is a representative porous material, together with activated carbon, is widely used as a humidity controller, water purifier and soil conditioner, and is used for removing chlorine based gases and sulfur oxides in waste gas, for example, it simply uses the adsorptive properties of micro pores inside the porous carbon materials, in the same manner as activated carbon, and nitrate nitrogen, nitrite nitrogen, fluorine, arsenic, cyan and the like which exist in the form of anions are barely absorbed.

Our invention has taken the above described situation into consideration, and it is an object thereof to provide an anion adsorbing carbon material which is inexpensive, environmentally friendly and excellent in anion adsorption, as well as providing a manufacturing method and manufacturing facilities for the same.

The present inventors examined the anion absorbing performance of a material gained by contacting a solution including calcium ions (it is desirable for calcium ions to be included mainly as cations), for example, a solution such as lime water or a suspension of milk of lime of a calcium hydroxide with a raw material which comprises plant(s), in advance, that is, before carbonizing this material, so that Ca (calcium) is introduced into this material. The impregnated material is then carbonized so that this material into which Ca has been introduced and contacting the resultant charcoal, into which Ca has been introduced, with an acid such as HCl, $H_2SO_4$ or the like, and as a result, found that the resultant product had excellent anion adsorption ability. In addition, wastewater can be treated simply by neutralizing the acid, which is environmentally friendly.

As a solution including calcium ions, a calcium acetate solution, a calcium chloride solution and the like can be used, in addition to lime water and milk of lime, a solution including 0.03 weight % to 30 weight % of calcium, preferably 0.1 weight % to 7.0 weight %, is appropriate.

As a method for contacting the solution including calcium ions with the above described material originating from plant (s) such as a plant material of one or of a plurality of mixed plant material, by dripping, application, spraying, atomizing or the like of the solution including calcium ions is possible, and immersion of the above described material in the solution including calcium ions is most efficient. In addition, as a method for contacting the acid solution with the carbonized material, dripping, application, spraying, atomizing or the like of the acid solution is possible, and immersion of the carbonized material in the acid solution is most efficient.

Thus, a manufacturing method for an anion adsorbing carbon material can be characterized in that a raw material which comprises plant(s) is contacted with a solution including calcium ions, and after that, is processed to be carbonized, and subsequently, contacted with an acid solution.

In addition, a manufacturing method for an anion adsorbing carbon material is provided. That is, another aspect of the invention is characterized in that a raw material which comprises plant(s) with which a solution including calcium ions have been contacted is then carbonized and the carbonized material is contacted with an acid solution.

Furthermore, another aspect of the invention is characterized in that a carbonized material gained by carbonizing a raw material which comprises plant(s) with which a solution including calcium ions have been contacted is contacted with an acid solution.

As the base material originating from plant(s) in this invention, though any plant could be applied, a material of one or more from among natural fibers and ligneous materials, which makes the carbonized material of the above described material porous, is desirable, and any type of ligneous material, such as thinning, lumber and waste wood, as well as natural fibers such as hemp, can be cited as examples. In the case where a solution (for example, lime water or milk of lime) barely including anions (for example, chloride ions) that can be ion exchanged with anions that are the object of adsorption and including calcium ions can be used as the solution with which the above described material is contacted.

However, it is desirable for the above described material to be a material where innumerable particles of a calcium compound having a diameter of no greater than 100 nm are formed in the micro pores of a carbonized material when the material is carbonized after calcium has been introduced, and it is preferable to use ligneous chips of a size of no greater than 10 mm gained by processing a conifer, such as Japanese cypress or cedar having a high water absorbency.

In addition, in the case where a solution (for example, a calcium chloride solution) including both anions (for example, chloride ions) which can be ion exchanged with anions that are the object of adsorption and calcium ions is used, it is desirable for the solution to easily soak into the above described material when the material is immersed in the solution, and it is preferable to use ligneous chips of a size of no greater than 50 mm gained by processing a conifer, such as Japanese cypress or cedar having high water absorbency.

Furthermore, whichever solution is used, bamboo, sawdust, chaff, coconut palm, betel-nut palm, jute and straw can be used as the material originating from plant(s). In addition to these, agricultural waste, such as peels and pulp from mandarin oranges and apples, can be cited as the above described material originating from plant(s). In addition, the portion of plants having conductive tissue (vessels, tracheids and sieve tubes) are particularly preferable as the material originating from plant(s).

In this invention, a solution including calcium ions, for example, lime water or milk of lime, contacts with a raw material which comprises plant(s). When the above described material is immersed in the solution including calcium ions, the solution soaks into the material, and thereby, chips into which Ca has been introduced can be produced.

In particular, in the case where an alkali solution (for example, lime water) is used as the solution including calcium ions, as shown in FIG. 7(A), ligneous chips 2, which are an example of a raw material which comprises plant(s), can be immersed in and is contacted with lime water C, so that chips 30 into which Ca has been introduced [see FIG. 7(C)] can be gained, and this is considered to be because, as shown in FIG. 7(B), organic matter in ligneous chips 2 is dissolved in alkali, and calcium ions react with a certain component of ligneous chips 2. Here, it is preferable for the solution including calcium ions to contain 0.03 weight % to 30 weight % of calcium, and it is more preferable for it to contain 0.1 weight % to 7.0 weight %.

Next, in this invention, the gained chips 30 into which Ca has been introduced as described above [see FIG. 8(A)] are carbonized, and thereby, charcoal 31 into which Ca has been introduced (hereinafter simply referred to as Ca charcoal) is gained [see FIG. 8(C)], and it is considered that at this point during carbonization, organic matter in chips 30 into which Ca has been introduced [see FIG. 8(B)] decomposes due to heat, and at the same time, calcium ions deposit on the surface of the walls of micro pores in chips 30 into which Ca has been introduced [see FIG. 8(C)]. In this case, calcium ions deposit on the surface of the walls of micro pores in chips 30 into which Ca has been introduced [see FIG. 8(B)], and this is considered to be because calcium ions become of a microscopic and highly dispersed state, and thereby, many functional groups can be drawn out from every corner in the walls of the micro pores.

An acid solution can contact this carbonized material, and thereby, functional groups which have been drawn out form the walls of micro pores in the carbonized material are combined with anions which can be ion exchanged with anions that are the object of adsorption. As a result of diligent research, the present inventors found that more functional groups of the carbonized material can be generated during the process of carbonization by controlling the temperature and the time period.

That is to say, the material can be cooled naturally after a temperature for carbonization of 650° C. to 750° C. has been maintained, for example, for one hour, more functional groups can be formed, in comparison with a case where the material is cooled naturally after the temperature for carbonization of approximately 600° C. or approximately 800° C. has been maintained for one hour. In particular, when a material was contacted with a calcium and carbonized at a temperature for carbonization of 650° C. to 750° C. as described above, and observed through an electron microscope, a state where microscopic particles of the calcium compound were deposited on the surface of walls of the micro pores as described above and were uniformly dispersed was observed.

When the temperature for carbonization was approximately 600° C., a state where microscopic particles of a calcium compound did not sufficiently deposit on the walls of the microscopic pores as described above was observed. In addition, when the temperature for carbonization was approximately 800° C., though deposition of microscopic particles of a calcium compound on the walls of the micro pores as described above was observed, the state was such that there were many missing portions. As described above, 650° C. to 750° C. can be cited as a desired temperature range for carbonization which is required for a calcium to draw out as many functional groups as possible from the walls of the micro pores in the carbonized material as described above.

When the above described calcium charcoal 31, for example, is immersed in an HCl solution H, for example [see FIG. 9(A)], calcium ions which have combined with functional groups on the surface of the walls of the micro pores in Ca charcoal 31 and the above described functional groups [see FIG. 9(B)] combine with chloride ions [see FIG. 9(C)], so that acid treated Ca charcoal 32 [see FIG. 9(D)] where chloride ions combine with these functional groups directly or via calcium ions is produced.

As an acid solution for use in this invention, acid solutions which do not cause any problems in the subsequent treatment of wastewater at the time of manufacture, such as HCl and $H_2SO_4$, can be cited. The concentration of the acid solution can be no lower than 0.01 mol/L, that is to say, in a range from 0.01 mol/L to 20 mol/L, and a range from 0.1 mol/L to 10 mol/L is preferable. A concentration of lower than 0.01 mol/L has a disadvantage, such that sufficient desirable effects cannot be gained. Here, though it is desirable for the acid solution to include anions which can be ion exchanged with anions that are the object of adsorption, there is no such limitation in the case where anions which can be ion exchanged with anions that are the object of adsorption are included in the solution with which the material originating from plant(s) is contacted before carbonization.

In addition, it is efficient to carry out this acid treatment through immersion in an acid solution, and it is preferable to do this under reduced pressure, that is, it is preferable to do this under pressure in a range from 1330 Pa to 13.3 Pa.

The present inventors have found that in the case where a raw material which comprises plant(s) has been contacted with a solution including a metal chloride, for example, a solution including $CaCl_2$, in advance, so that $CaCl_2$ is introduced into the material before this material is carbonized, and after that, this material into which $CaCl_2$ has been introduced is carbonized, the carbonized material gained as a result of this has excellent anion absorbing performance.

Thus, a manufacturing method for an anion adsorbing carbon material is characterized in that a raw material which comprises plant(s) is contacted with a solution including a metal chloride, and after that, carbonized, and the above described metal chloride is contained within this carbonized material. Chloride ions of the metal chloride that is contained within the carbonized material exhibit anion exchanging ability, and therefore, the carbonized material functions as an anion adsorbing carbon material. Here, as the method for contacting the solution that includes a metal chloride with the above described material originating from plant(s), though dripping, application, spraying, atomization and the like of the above described solution are possible, immersion of the above described material in the above described solution is most efficient.

In accordance with the above described manufacturing method for an anion adsorbing carbon material, when the above described material originating from plant(s) is immersed in a solution including $CaCl_2$ as a metal chloride, and thus, a process for introducing calcium ions and chloride ions into the material is carried out, and after that, this material into which $CaCl_2$ has been introduced is carbonized, excellent anion adsorbing ability can be recognized in the gained charcoal into which $CaCl_2$ has been introduced.

That is to say, as shown in FIG. 14(A), when ligneous chips 2, for example, which is a material, are immersed in a $CaCl_2$ solution M so that they make contact with $CaCl_2$ solution M, calcium ions and chloride ions in $CaCl_2$ solution M are introduced into ligneous chips 2, so that, as shown in FIG. 14(C), chips 35 into which $CaCl_2$ has been introduced are gained. This is because, as shown in FIG. 14(B), $CaCl_2$ solution M soaks into the tissue, in particular, the conductive tissue, in ligneous chips 2. Here, as the concentration of the above described $CaCl_2$ solution M that is used for pre-processing (contact processing) on the material, 0.1 weight % to 50 weight % of $CaCl_2$ is preferable, and 1 weight % to 20 weight % is more preferable, in terms of cost. In the case where the concentration is lower than 0.1 weight %, high anion adsorbing ability is not gained, while in the case where the concentration exceeds 50 weight %, the anion adsorbing ability does not increase.

Next, when the above described chips 35 into which $CaCl_2$ has been introduced are carbonized, as shown in FIG. 15(A), a carbon material 37 is gained, as shown in FIG. 15(C). During this process of carbonization, organic matter in chips 35 into which $CaCl_2$ has been introduced decomposes due to heat, and at the same time, chloride ions and calcium ions deposit on the surface of the walls of the micro pores in chips 35 into which $CaCl_2$ has been introduced. At this time, as shown in FIG. 15(B), chloride ions and calcium ions deposit on the surface of the walls of the micro pores in chips 35, into which $CaCl_2$ has been introduced, in a fine and highly dispersed state, and draw out many functional groups from every corner in the walls of the micro pores. As a result, as shown in FIG. 15(C), it is considered that a state where chloride ions combine with a great number of functional groups which have been drawn to the surface of the walls of the micro pores directly or via metal ions (in this case, calcium ions) is gained.

Here, as the content of the above described metal chloride, it is desirable for 2% to 25% of the metal chloride which combines within the carbonized material to be contained as ash content. The metal compound which combines within the carbonized material is a metal chloride excluding metal chlorides which simply adhere to the inside of the carbonized material, that is to say, a metal chloride which combines within the carbonized material, and therefore, remains undissolved after being washed with water or an acid. In the case where the content is lower than 2%, the anion adsorbing ability becomes inferior, while, in the case where the content exceeds 25%, the anion absorbing ability tends not to increase.

As a method for contacting water and/or an acid with the above described carbonized material, though dripping, application, spraying, atomization or the like of water and/or acid is possible, immersion of the above described carbonized material in water and/or an acid is most efficient.

The reason why it is preferable to contact water and/or an acid with the above described carbonized material can be considered to be as follows. That is to say, when carbon material ($CaCl_2$ charcoal) 37 which has been produced as shown in FIGS. 14 and 15 is immersed in (contacted with) an acid, for example, hydrochloric acid H or sulfuric acid, as shown in FIG. 16(A), extra crystal of a metal chloride which adheres to carbon material 37 is removed. In addition, in the case where hydrochloric acid H is used as the acid, new chloride ions which combine with the functional groups of the above described carbon material 37 are added, so that the state changes from that shown in FIG. 16(B) to that shown in FIG. 16(C), and as a result of this, the anion adsorbing ability of the manufactured anion adsorbing carbon material increases, which is preferable. Here, in the case where water contacts with the above described carbonized material instead of an acid, such as hydrochloric acid H, extra crystal of a metal chloride adhering to carbon material 37 is removed, and the anionic adsorbing ability increases.

Here, $CaCl_2$ and $BaCl_2$ can be cited as the above described metal chlorides.

It is preferable for the temperature for carbonization of the above described material to be 400° C. to 1000° C. This is because in the case where the temperature for the carbonization process is lower than 400° C., micro pores are not created, and the performance as a an adsorbing material becomes inferior, while in the case where the above described temperature exceeds 1000° C., adsorbing properties are not gained, due to excessive carbonization. Here, the temperature for the carbonization process is more preferably 500° C. to 900° C., and most preferably approximately 600° C. to 800° C.

In addition, the anion adsorbing carbon material of this invention may be gained by removing the adsorbed anions from the anion adsorbing carbon material which has adsorbed anions and combining anions which can be ion exchanged with anions which are the next object of adsorption with the carbon material in place of the above described removed anions. Here, anions which can be adsorbed by the anion adsorbing carbon material of this invention are anions which can be an ion exchanged with anions that have combined in advance with the surface of the walls of the micro pores in the carbon material, and are naturally anions excluding the anions which have combined with functional groups on the surface of the walls of the micro pores in the above described carbon material directly or via metal ions.

A manufacturing facilities for an anion adsorbing carbon material is characterized by comprising a carbonization apparatus for carbonizing a raw material which comprises plant(s)

and an apparatus for contacting a carbonized material which is produced by this carbonization apparatus with an acid solution.

In this case, a carbonization furnace which allows for setting of the temperature for carbonization is used as the carbonization apparatus. In addition, any type of well-known container for an acid solution, such as an acid-resistant tank, can be used as the apparatus for contacting the carbonized material which is produced by this carbonization apparatus with an acid solution.

Any type of well-known container, such as a tank, can be used as the apparatus for contacting a raw material which comprises plant(s) with a solution including calcium ions. In addition, a carbonization furnace which allows for setting of the temperature for carbonization is used as the carbonization apparatus. In addition, any type of well-known container for an acid solution, such as an acid-resistant tank, can be used as the apparatus for contacting the carbonized material which is produced by this carbonization apparatus with an acid solution.

As the method (apparatus) for contacting the solution including calcium ions with the above described material originating from plant(s), dripping, application, spraying, atomizing or the like of the solution including calcium ions is possible, and immersion of the above described material in the solution including calcium ions is most efficient. In addition, as the method (apparatus) for contacting the acid solution with the carbonized material, dripping, application, spraying, atomizing or the like of the acid solution is possible, and immersion of the carbonized material in the acid solution is most efficient.

A raw material which comprises plant(s) is contacted with a solution including calcium ions, and after, that, carbonized, and subsequently, contacted with an acid solution, and therefore, an anion adsorbing carbon material having anion adsorbing properties equal or superior to those of an anion exchange resin can be gained by setting an appropriate temperature for carbonization. In addition, an anion adsorbing carbon material manufactured in accordance with the above described manufacturing method for an anion adsorbing carbon material has a material originating from plant(s) as a main body and is environmentally friendly.

An anion adsorbing carbon material which can be repeatedly restored for use can be gained. The adsorbed anions are removed from the above described anion adsorbing carbon material, and anions which can be ion exchanged with anions that are the next object of adsorption are combined with the above described anion adsorbing carbon material in place of the above described removed anions, and thereby, the above described anion adsorbing carbon material can be repeatedly restored for use.

Therefore, an anion adsorbing carbon material having anion adsorbing ability can be gained without any problems in the treatment of wastewater with Fe, unlike in the case where a raw material which comprises plant(s) is immersed in a solution of iron chloride after being carbonized.

In addition, in this invention, an anion adsorbing carbon material having anion adsorbing properties which are equal or superior to those of an anion exchange resin can be gained by setting an appropriate temperature for carbonization when a raw material which comprises plant(s) is contacted with a solution including calcium ions, and after that, carbonized.

A raw material which comprises plant(s) is carbonized, and thereby, micro pores are formed inside, and a great number of functional groups are formed on the walls of these micro pores, and therefore, these functional groups can combine with anions which can be ion exchanged with anions that are the object of adsorption directly or via calcium ions, so that the anion adsorption ability of the carbonized material can be efficiently increased.

In an anion adsorbing carbon material formed by a manufacturing facilities for an anion adsorbing carbon material, chloride ions of the metal chloride which is contained within the carbonized material exhibit anion exchanging ability, and therefore, the carbonized material functions as an anion adsorbing carbon material.

In the case where the above described carbonization apparatus carbonizes a raw material which comprises plant(s) so that micro pores are formed inside and a great number of functional groups are drawn out to the surface of the walls of these micro pores, and at the same time, anions (for example, Cl—) which can be ion exchanged with anions (for example, $NO_3$—) that are the object of adsorption are combined with these functional groups directly or via metal ions, the anion adsorption ability can be efficiently increased by carbonizing a raw material which comprises plant(s) which has contacted with a metal chloride.

In the case where an apparatus for removing extra crystal of a metal chloride that adheres to the carbonized material so that the anion adsorbing ability increases by contacting a carbonized material which has been created in the above described carbonization apparatus with water and/or an acid solution is provided, the anion adsorption ability of the anion adsorbing carbon material can further be increased, which is preferable.

In the case where the configuration is provided with a drying area for drying an intermediate body for gaining an anion adsorbing carbon material, so that the above described intermediate body is dried by using the heat that is discharged from the carbonization apparatus in this drying area, the time for heating which is required for carbonizing this intermediate body can be shortened. In addition, in the case where an intermediate body made of a carbonized material is contacted with water and/or an acid solution, this intermediate body is dried, and thereby, a lightweight anion adsorbing carbon material which is easy to handle can be gained. Here, an intermediate body is dried using discharged heat in the drying area, and therefore, energy can be used efficiently.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

EXPLANATION OF DRAWING SYMBOLS

Figure 1:
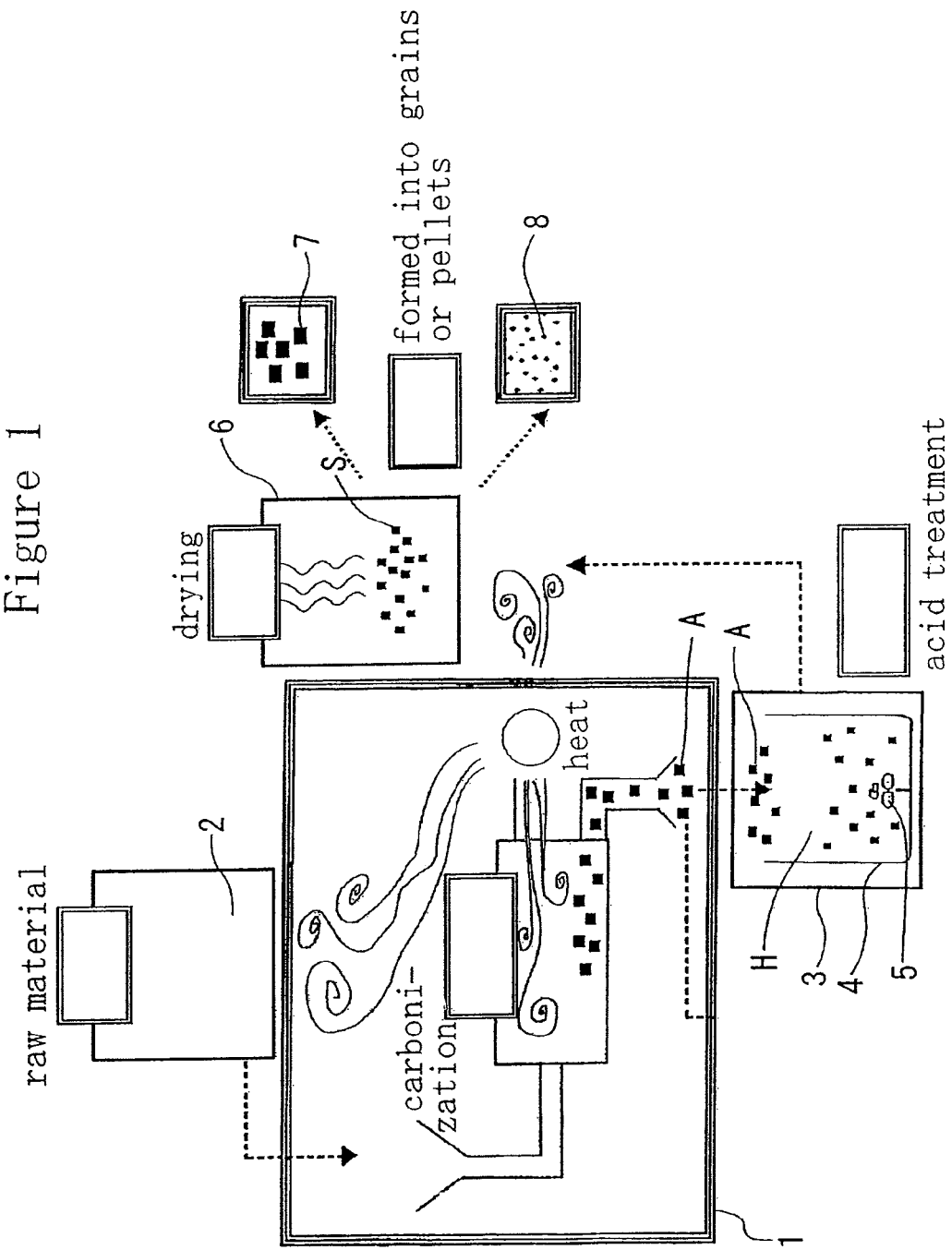
FIG. 1 is a diagram showing a configuration of a first embodiment.
Figure 2:
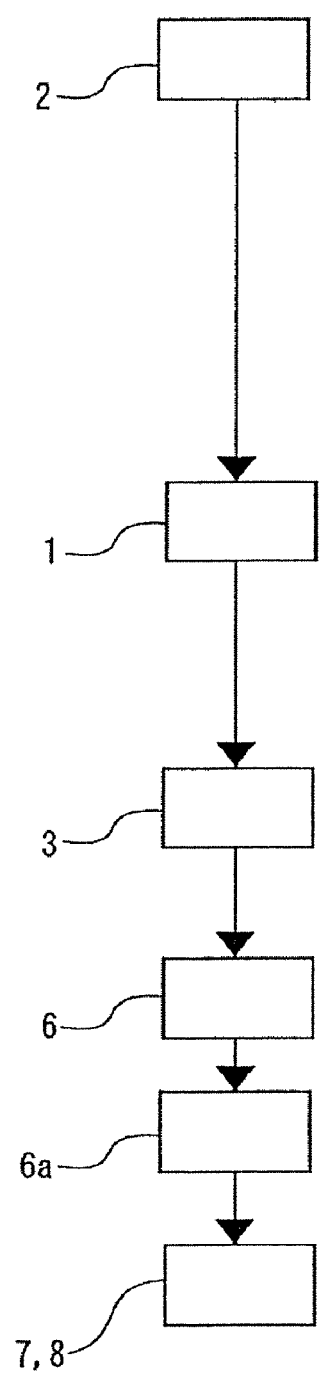
FIG. 2 is a diagram illustrating manufacturing process steps according to the above described embodiment.

1 carbonization apparatus
2 raw material which comprises plant(s)
3 apparatus for contacting carbonized material with acid solution
10 apparatus for contacting material with solution including metal chloride
12, 24 drying area
22 apparatus for increasing anion adsorbing ability
A, 31, 36 carbonized material (intermediate body)
C solution including calcium ions
H acid solution
M solution including metal chloride
S, 30, 32, 35, 37 intermediate bodies FIGS. 1 and 2 show a first embodiment of the invention.

In FIGS. 1 and 2, 1 indicates a carbonization furnace (an example of a carbonization apparatus for carbonizing a raw material which comprises plant(s)) for carbonizing a ligneous material (an example of a raw material which comprises plant(s)) 2 of plant(s), for example, natural fibers, including hemp, or lumber, without activating the material. Ligneous chips, for example, can be used as the above described material 2. These ligneous chips are gained by processing a conifer, such as Japanese cypress or cedar having high water absorbency and can have a size of no greater than, for example, 10 mm.

3 indicates facilities for acid treatment such as a tank which contact an acid solution with a carbonized material that has been created by carbonization apparatus 1, and has mixing blades 5 inside a container 4 for containing an acid solution H, for example, HCl and $H_2SO_4$. The concentration of this acid solution is, for example, 5 mol/L. Apparatus for acid treatment 3 treats charcoal A in chip form that has been gained in carbonization furnace 1 with acid. In addition, (1) acid treated charcoal (an example of an intermediate body) S which can be used immediately after acid treatment is used as it is. In addition, (2) the above described charcoal S may be neutralized with alkali after acid treatment if necessary, and in this case, (3) the neutralized acid treated charcoal S may be washed with water if necessary.

6 indicates a drier for drying acid treated charcoal S after acid treatment or acid treated charcoal S after acid treatment, neutralization and washing with water using the heat discharged from the carbonization furnace. Here, drying may be omitted if the charcoal is used in a moist state. 6*a* (see FIG. 2) indicates a processing portion for processing the dried acid treated charcoal S. 7 indicates a product in pellet form which has been processed from the above described dried acid treated charcoal S, and 8 indicates a product which has been formed by crushing dried acid treated charcoal S. Here, the products are processed in different ways, depending on the application. In addition, another product, where dried acid treated charcoal S is stuck to an unwoven cloth, for example, can be cited, in addition to products 7 and 8.

Figure 3:
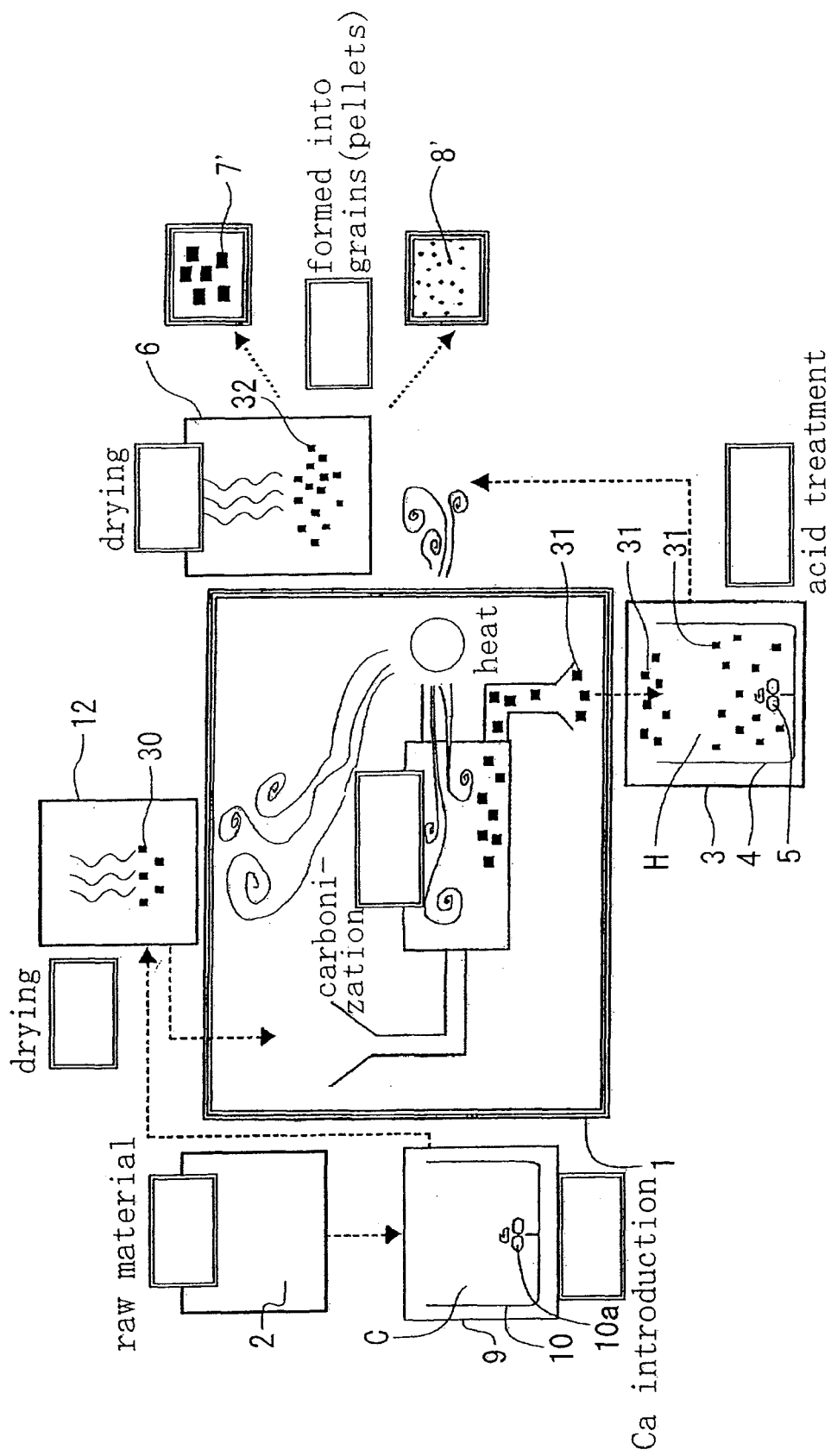
FIG. 3 is a diagram showing a configuration of a second embodiment.
Figure 4:
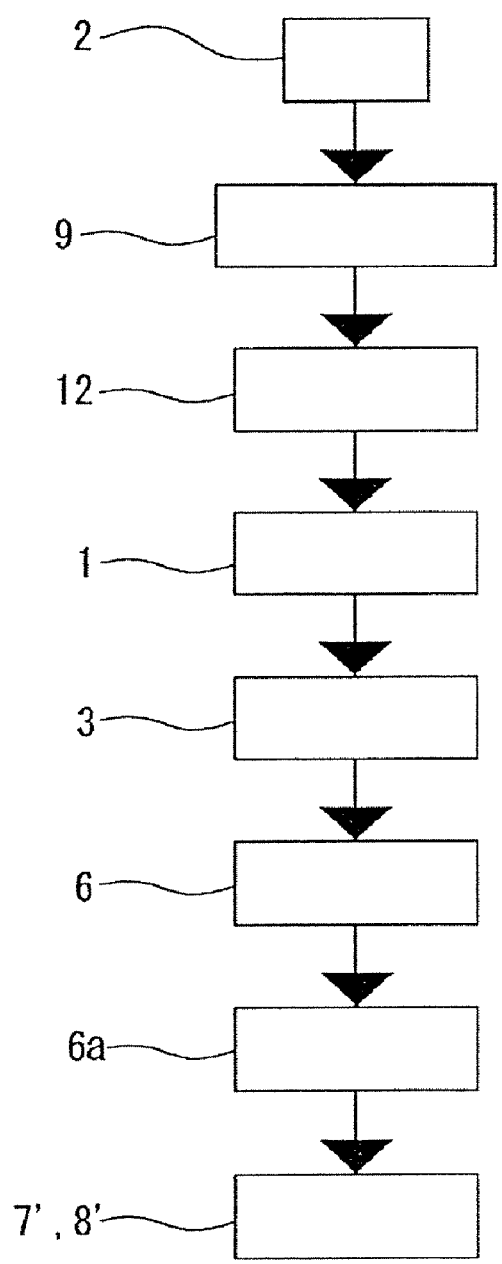
FIG. 4 is a diagram illustrating manufacturing process steps according to the second embodiment.

FIGS. 3 and 4 show a second embodiment of the invention.

In FIGS. 3 and 4, acid treated Ca charcoal 32, which is an example of an anion adsorbing carbon material is gained by drying ligneous material (an example of a raw material which comprises plant(s)) 2 of plant(s), for example, natural fibers, including hemp or lumber, using dryer 12 after immersion in a solution including calcium ions (for example, lime water C) which is prepared in a Ca introducing calcification apparatus (an example of an apparatus for contacting a raw material which comprises plant(s) with a solution including calcium ions) 9. Subsequently, carbonizing the material in a carbonization furnace (an example of a carbonization apparatus) 1 without activating the material, and after that, immersing the material in an acid solution H, for example, HCl or $H_2SO_4$, using an apparatus for acid treatment 3 for contacting the carbonized material which has been created by carbonization apparatus 1 with an acid solution, and furthermore, drying the material using a dryer 6 and processing the material in a processing portion 6a.

In this embodiment, ligneous chips are used as the above described material originating from plant(s) (hereinafter, simply referred to as material) 2. These ligneous chips are gained by processing a conifer, such as Japanese cypress or cedar having high water absorbency and having a size of no greater than, for example, 10 mm.

The above described Ca introducing apparatus 9 is an apparatus for introducing Ca into ligneous chips 2, and is provided with a container 10 which contains a solution including calcium ions in which ligneous chips 2 are immersed. In this embodiment, ligneous chips 2 are immersed in the lime water C, and ligneous chips 2 are immersed in the lime water C of a predetermined concentration (for example, 5 weight %), and after that, taken out from container 10, and thereby, chips into which Ca has been introduced (an example of an intermediate body) 30 can be gained. In this case, it is preferable to drive mixing blades 10a which are provided inside container 10 while the ligneous chips are immersed, in order for the solution to sufficiently soak into ligneous chips 2, or for calcium ions to sufficiently react with a component of ligneous chips 2.

The gained chips 30 into which Ca has been introduced are dried using the above described dryer 12. In this embodiment, dryer 12 dries chips 30 into which Ca has been introduced using heat discharged from the carbonization furnace. Here, the efficiency in processing improves when milk of lime is used. In addition, a calcium chloride solution or a calcium acetate solution can be used instead of lime water C or milk of lime.

The dried chips 30 into which Ca has been introduced are carbonized in carbonization furnace 1, so that Ca charcoal (an example of an intermediate body made of a carbonized material) 31 in chip form is gained. As for the conditions for carbonization in this embodiment, the temperature for carbonization is 650° C. to 750° C. for a period of one hour.

The above described apparatus for acid treatment 3 is provided with a container 4 which contains an acid solution H, for example, HCl or $H_2SO_4$, and mixing blades 5 are provided inside this container 4. The concentration of this acid solution H is, for example, 5 mol/L. In the above described apparatus for acid treatment 3, Ca charcoal 31 in chip form that has been gained in carbonization furnace 1 is treated with acid, so that acid treated Ca charcoal 32 is gained. In addition, it is preferable to drive mixing blades 5 which are provided inside container 4, so that dissolving of calcium carbonate ($CaCO_3$) on the surface of Ca charcoal 31 in the acid is accelerated and chloride ions and calcium ions sufficiently react with functional groups on the surface of the above described Ca charcoal 31. The gained acid treated Ca charcoal (an example of an intermediate body made of a carbonized material) 32 is dried using the above described drier 6. In this embodiment, dryer 6 dries acid treated Ca charcoal 32 using heat being discharged from the carbonization furnace to lower the cost of the processing.

In addition, (1) acid treated Ca charcoal 32 which can be used immediately after acid treatment step and the drying step is processed directly into a final product as an anion adsorbing material. In addition, (2) acid treated Ca charcoal 32 may be further neutralized with alkali after treatment with acid if necessary, and in this case, (3) the neutralized acid treated Ca charcoal may be washed with water if necessary. Here, drying may be omitted in the case where the product is to be used in a moist state.

7' indicates a product in pellet form which is gained by processing acid treated Ca charcoal 32, and 8' is a product which is formed by crushing acid treated Ca charcoal 32. Here, the products are processed differently, as shown below, depending on the application. In addition, another product where acid treated Ca charcoal 32 is stuck to an unwoven cloth, for example, can be created, in addition to products 7' and 8'. Here, in some cases, chips 30 into which Ca has been introduced and Ca charcoal 31 are prepared in separate factories, and in such cases, manufacturing of acid treated Ca charcoal 32 may start in the middle of the process in each of the above described embodiments. In addition, acid treated Ca charcoal 32 can be used as it is, without processing.

<Nitrate Nitrogen and Nitrite Nitrogen Adsorbing Test>

[Testing Method]

Five containers having 50 ml of nitrate solution and nitrite solution of a concentration of 50 mg/L (50 ppm), respectively, were prepared (standard liquid), and five types of the following samples were put into the corresponding containers for each standard liquid, and the containers were shaken for ten hours under the conditions of, for example, 200 rpm at 20° C., and after that the concentration of nitrate nitrogen and the concentration of nitrite nitrogen in the above described nitrate solution and nitrite solution were respectively measured and the amount of adsorption was calculated:

(1) 200 mg of charcoal, which was gained by carbonizing ligneous chips 2 at 700° C. (hereinafter simply referred to as charcoal) was used as a comparative example, (2) 200 mg of iron chloride charcoal, which was produced by immersing charcoal which had been gained by carbonizing ligneous chips 2 at 700° C. in 1 mol/L of an $FeCl_3$ solution and after that washing the charcoal with water, was used as a comparative example, (3) 200 mg of acid treated charcoal, which was prepared by immersing charcoal which had been produced by carbonizing ligneous chips 2 at 700° C. in 5 mol/L of an HCl solution and after that washing the charcoal with water, (4) 200 mg of acid treated Ca charcoal 32 (anion adsorbing carbon material), which was gained by immersing charcoal which had been gained by immersing ligneous chips 2 in 5 weight % of lime water, and after that, carbonizing the chips at 700° C. in 5 mol/L of an HCl solution, and (5) 200 mg of an anion exchange resin, which was used as a comparative example.

[Results]

Figure 5:
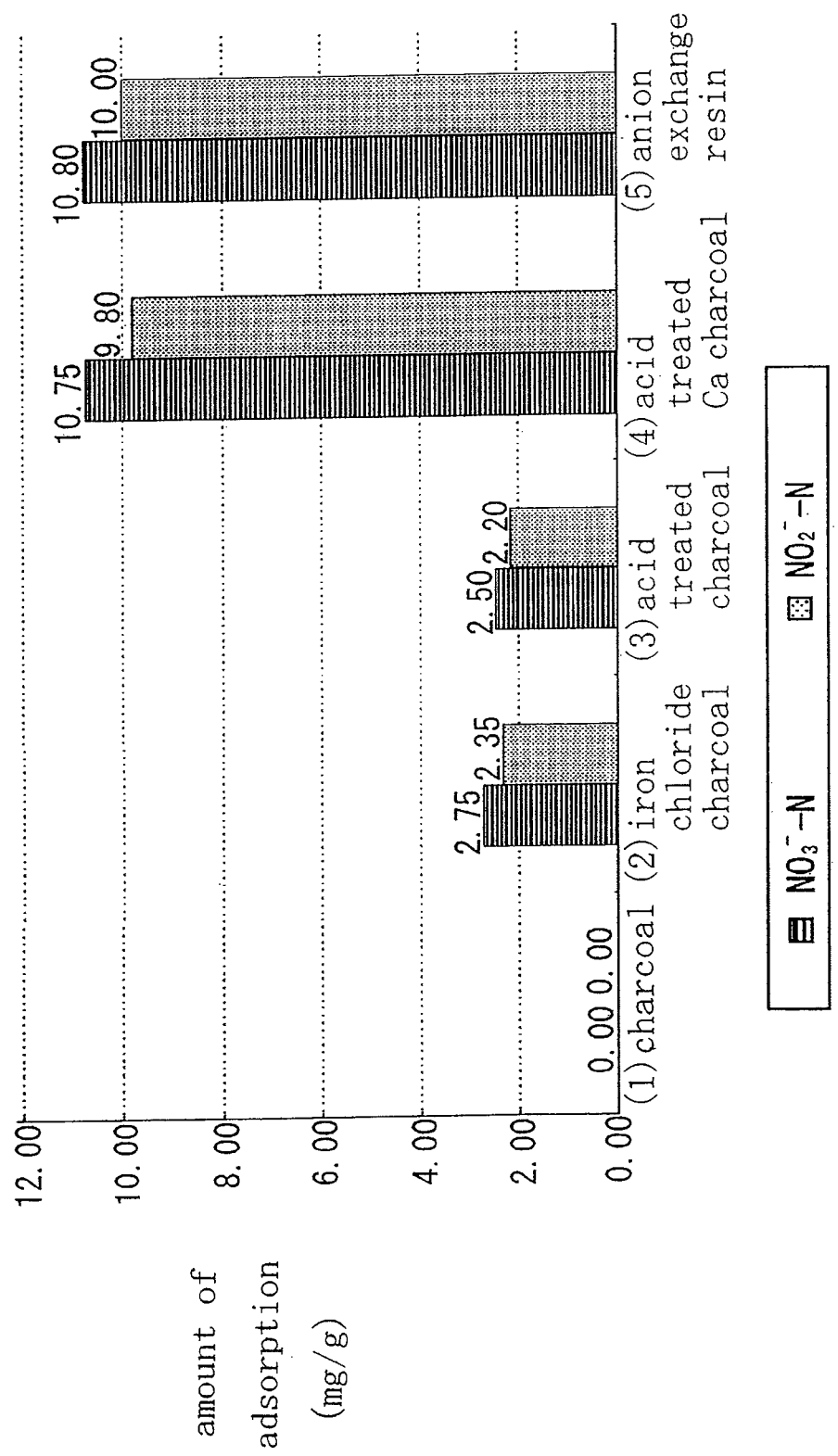
FIG. 5 is a graph respectively showing the amount of nitrate nitrogen and nitrite nitrogen adsorbed by anion adsorbing carbon materials which were produced in the first and second embodiments during an adsorption testing.

FIG. 5 shows a comparison in the adsorbing abilities of nitrate nitrogen and nitride nitrogen among the above described respective samples. The charcoal of (1) which was carbonized at 700° C. barely adsorbed nitrate nitrogen or nitrite nitrogen, while the iron chloride charcoal of (2) adsorbed 2.75 mg/g and 2.35 mg/g of nitrate nitrogen and nitrite nitrogen, respectively. In addition, acid treated charcoal S of (3) adsorbed 2.50 mg/g and 2.20 mg/g of nitrate nitrogen and nitrite nitrogen, respectively. The anion exchange resin of (5) adsorbed 10.80 mg/g and 10.00 mg/g of nitrate nitrogen and nitrite nitrogen, respectively.

Meanwhile acid treated Ca charcoal 32 of (4), which was gained by immersing ligneous chips 2 in lime water C, and after that, carbonizing the chips, and subsequently immersing the chips in an HCl solution, adsorbed 10.75 mg/g and 9.80 mg/g of nitrate nitrogen and nitrite nitrogen, respectively, and exhibited an adsorption ability which was equal to or greater than that of the anion exchange resin of (5).

Figure 10:
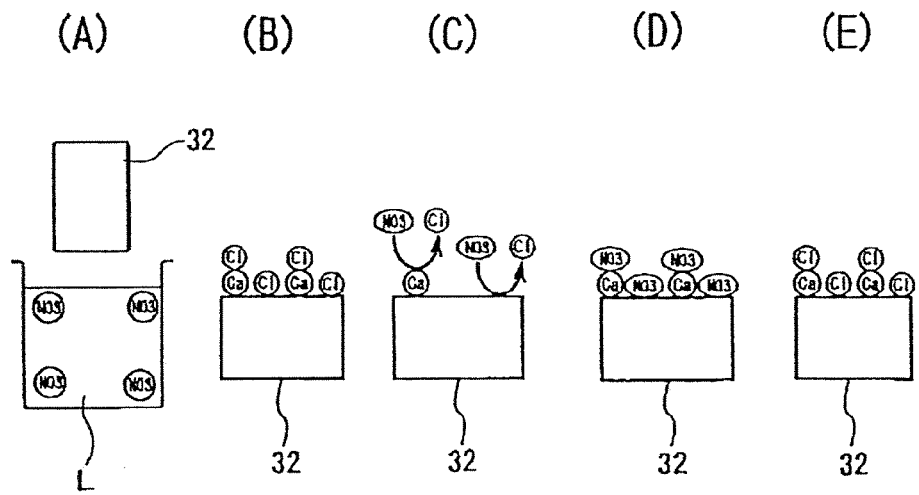
FIG. 10 is a diagram showing a mechanism for nitrate ion adsorption in an anion adsorbing carbon material gained in the second embodiment.

In addition, the mechanism for the above described acid treated Ca charcoal 32 to adsorb nitrate ions is considered as follows. As shown in FIG. 10(A), when acid treated Ca charcoal 32 (anion adsorbing carbon material) is immersed in a nitrate solution L, for example, nitrate ions in nitrate solution L are exchanged with chloride ions [see FIG. 10(B)] which have combined with functional groups on the surface of the walls of the micro pores in the acid treated Ca charcoal 32 directly or via calcium ions [see FIG. 10(C)], and thus, the nitrate ions adsorbed by acid treated Ca charcoal 32 [see FIG. 10(D)]. FIG. 10(E) shows a change in acid treated Ca charcoal 32 shown in FIG. 10(D) when this is immersed in a KCl (or NaCl) solution. That is to say, the acid treated Ca charcoal 32 which has adsorbed nitrate ions can repeatedly be restored by exchanging nitrate ions with chloride ions in the KCl (or NaCl) solution. This restoration test is described as follows:

<Restoration Test>
[Testing Method]

Samples of acid treated charcoal S and acid treated Ca charcoal 32 after the above described nitrate nitrogen adsorbing test had been carried out, were washed with 1 mol/L of a KCl (or NaCl) solution, and furthermore, it was washed with water. Subsequently, the standard liquid was exchanged and 50 ml (milliliter) of a nitrate solution of which the concentration of nitrate nitrogen was 50 mg/L was prepared as a standard liquid, and the first restoration test was carried out on the above described 200 mg of the samples which were washed with water. That is to say, the above described samples were put into a nitrate solution and the containers were shaken for ten hours under the conditions of, for example, 200 rpm at 20° C., and after that, the concentration of nitrate nitrogen in the above described nitrate solution was measured and the amount of adsorption was calculated, and in this manner, the first restoration test was carried out on the above described samples.

Next, the above described samples which were used in the first restoration test were washed with a KCl (or NaCl) solution of 1 mol/L, and furthermore, it was washed with water. Subsequently, the standard liquid was exchanged and 50 ml (milliliter) of a nitrate solution of which the concentration of nitrate nitrogen was 50 mg/L was prepared and a restoration test was carried out on 200 ml of the above described samples which had been washed with water as described above. That is to say, the above described samples were put into 50 ml (milliliter) of a nitrate solution and the containers were shaken for ten hours under the conditions of, for example, 200 rpm at 20° C., and after that, the concentration of nitrate nitrogen in the above described nitrate solution was measured and the amount of adsorption was calculated, and in this manner, the second restoration test was carried out on the above described samples. This process was repeated two additional times.

[Results]

Amount of nitrate nitrogen adsorbed by acid treated charcoal S

| | |
|---|---|
| Initial time | 2.5 mg/g |
| First restoration time | 2.5 mg/g |
| Second restoration time | 2.4 mg/g |
| Third restoration time | 2.5 mg/g |

Amount of nitrate nitrogen adsorbed by acid treated Ca charcoal 32

| | |
|---|---|
| Initial time | 10.8 mg/g |
| First restoration time | 10.6 mg/g |
| Second restoration time | 10.9 mg/g |
| Third restoration time | 10.7 mg/g |

It can be seen the above described acid treated charcoal S and acid treated Ca charcoal 32 after use can be washed with a dense KCl (or NaCl) solution, respectively, and furthermore, washed with water, and thereby, can be restored. Thus, it was found that acid treated charcoal S and acid treated Ca charcoal (anion adsorbing carbon material) 32 which had adsorbed nitrate nitrogen (anions) in the nitrate nitrogen adsorbing test were respectively washed with a KCl (or NaCl) solution, and furthermore, washed with water, and thereby, nitrate nitrogen (anions) which had been adsorbed in the nitrate nitrogen adsorbing test were removed and Cl— was combined instead of the removed nitrate nitrogen (anions), and thus, acid treated charcoal S and acid treated Ca charcoal 32 (anion adsorbing charcoal material) were respectively restored. That is to say, it was confirmed that acid treated charcoal S and acid treated Ca charcoal 32 (anion adsorbing carbon material) can be respectively washed with a KCl (or NaCl) solution and then washed with water after each use, and thereby, they can be used a number of times. Here, in the case where nitrite nitrogen is adsorbed and acid treated charcoal S and acid treated Ca charcoal are respectively used as an anion adsorbing carbon material, the restoration principle is the same.

<Fluoride Ion Adsorbing Test>
[Testing Method]

50 ml (milliliter) of a solution of which the concentration of fluoride ions was 50 mg/L (standard liquid) was prepared in separate containers, and five types of the following samples were put into the corresponding containers for each standard liquid, and the containers were shaken for ten hours under conditions of, for example, 200 rpm at 20° C., and after that, the concentration of fluoride ions in the above described solution were respectively measured and the amount of adsorption was calculated:

(1) 100 mg of charcoal, which was gained by carbonizing ligneous chips 2 at 700° C. (hereinafter simply referred to as charcoal) was used as a comparative example, (2) 100 mg of iron chloride charcoal, which was gained by immersing charcoal which had been gained by carbonizing ligneous chips 2 at 700° C. in 1 mol/L of an $FeCl_3$ solution and after that washing the charcoal with water, was also used as a comparative example, (3) 100 mg of acid treated charcoal, which was gained by immersing charcoal which had been gained by carbonizing ligneous chips 2 at 700° C. in 5 mol/L of an HCl solution and after that washing the charcoal with water, (4) 100 mg of an anion adsorbing carbon material (acid treated Ca charcoal 32), which was gained by immersing charcoal which had been gained by immersing ligneous chips 2 in 5 weight % of lime water, and after that, carbonizing the chips at 700° C. in 5 mol/L of an HCl solution, and (5) 100 mg of an anion exchange resin, was used as a comparative example.

Figure 6:
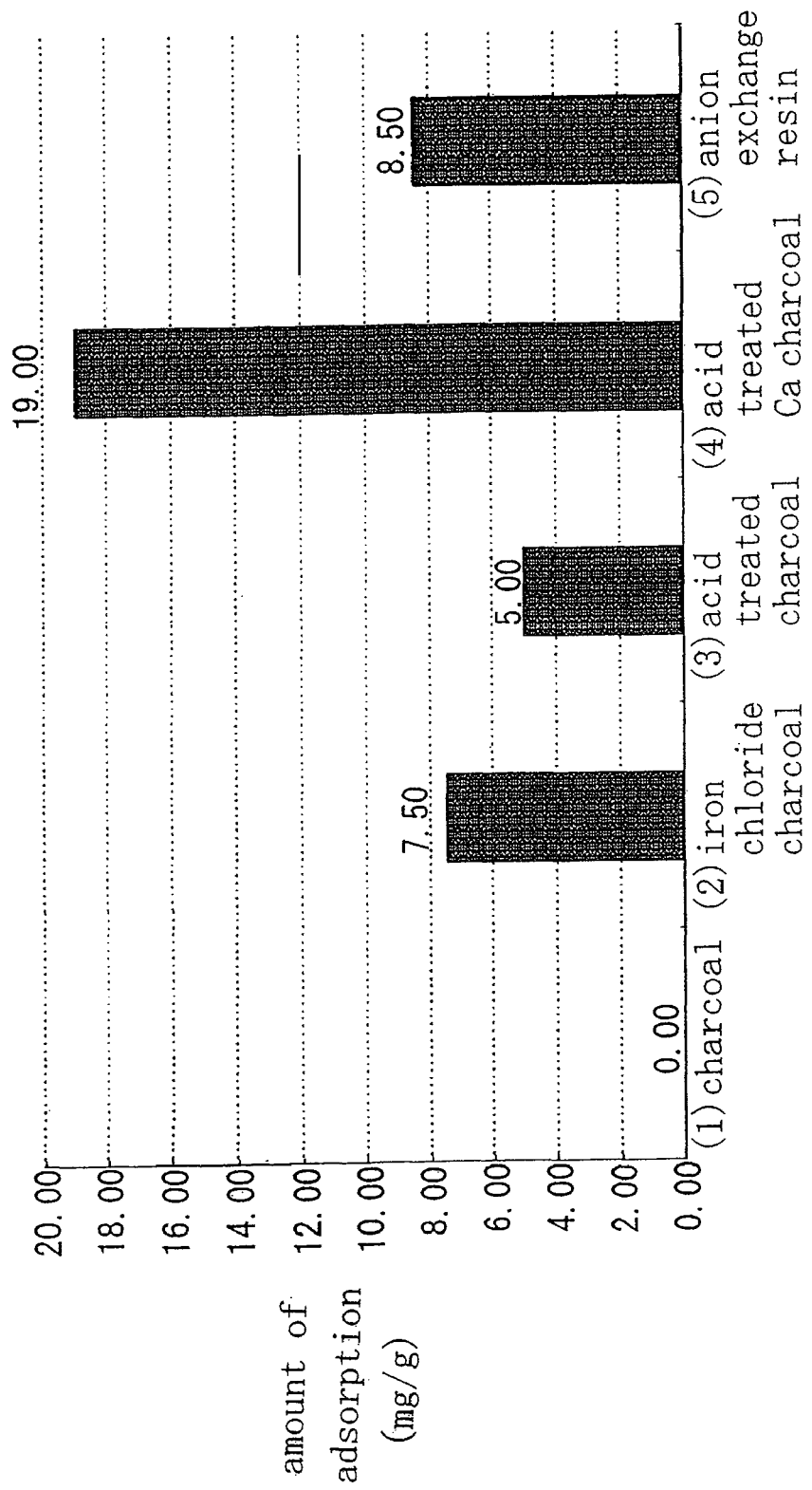
FIG. 6 is a graph respectively showing the amount of fluoride ions adsorbed by anion adsorbing carbon materials which were produced in the first and second embodiments during the adsorption testing.
Figure 7:
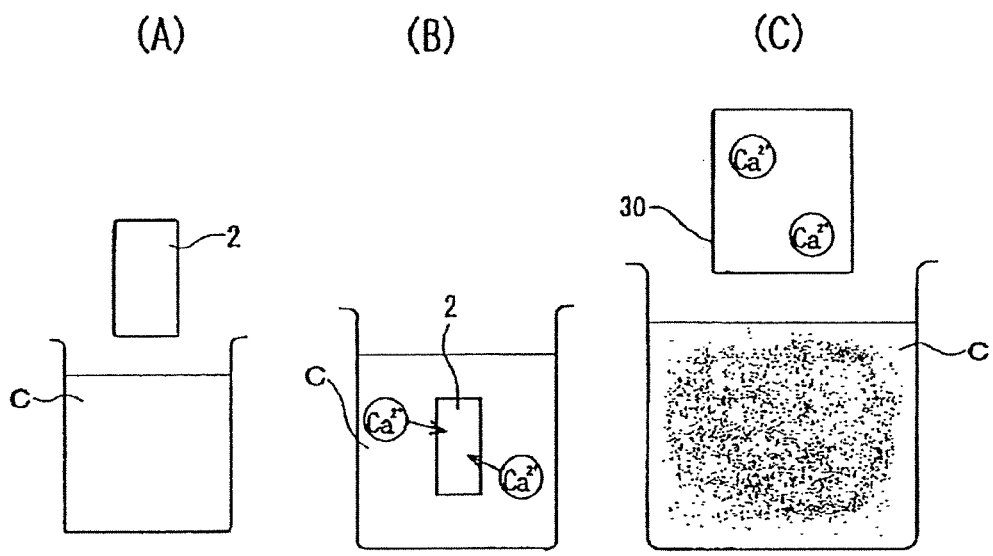
FIG. 7 is a diagram showing the steps in contacting a raw material which comprises plant(s) with a solution including calcium ions in the second embodiment.
Figure 8:
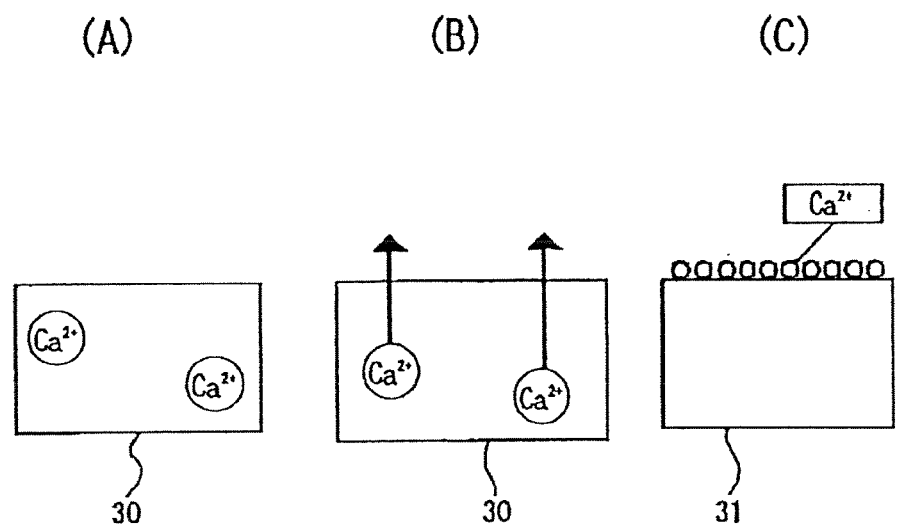
FIG. 8 is a diagram showing the steps in carbonizing the above described material after it has been contacted with the solution in the second embodiment.
Figure 9:
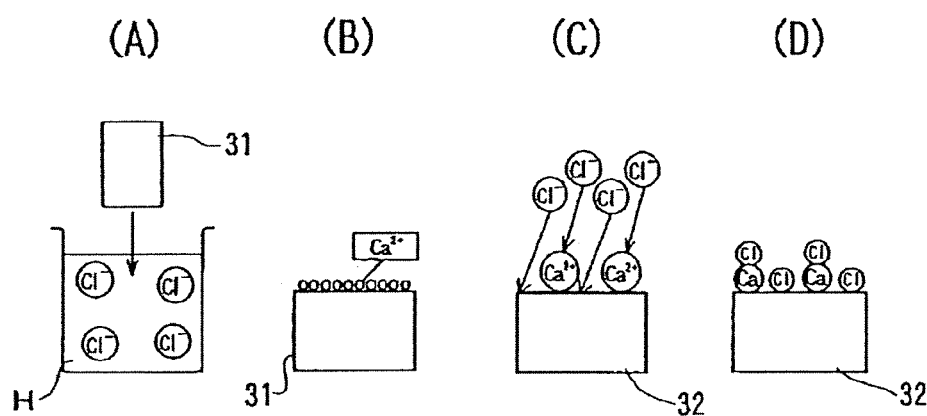
FIG. 9 is a diagram showing the steps in contacting a carbonized material which has been created by the carbonization apparatus with an acid solution in the second embodiment.

FIG. 6 shows a comparison of the fluoride ion adsorbing ability among the above described respective samples.

The charcoal of (1) carbonized at 700° C. barely adsorbed chloride ions, while the ion chloride charcoal of (2) adsorbed 7.50 mg/g of fluoride ions. In addition, acid treated charcoal S of (3) adsorbed 5.00 mg/g of fluoride ions. The anion exchange resin of (5) adsorbed 8.50 mg/g of fluoride ions.

Meanwhile, acid treated Ca charcoal 32 of (4) which had been gained by immersing ligneous chips 2 in lime water, and after that, carbonizing the chips, and subsequently, immersing the chips in an HCl solution adsorbed 19.00 mg/g of fluoride ions exhibited an adsorption ability which greatly exceeded the anion exchange resin of (5).

<Restoration Test>

[Testing Method]

Next, the samples of acid treated charcoal S and acid treated Ca charcoal 32 after the above described fluorine adsorbing test had been carried out, were washed with 1 mol/L of a hydrochloric acid (or sulfuric acid), and furthermore, the sample was washed with water. Subsequently, a standard liquid was exchanged and 50 ml (milliliter) of a solution of which the concentration of fluoride ions was 50 mg/L was prepared, and the first restoration test was carried out on the above described 200 mg of the samples which had been washed with water. That is to say, the above described samples were put into the above described solution and the containers were shaken for ten hours under the conditions of 200 rpm at 20° C. After shaking, the concentration of fluoride ions in the above described solution was measured and the amount of adsorption was calculated, and in this manner, a first restoration test was carried out on the above described samples. Next, the above described samples which had been used in the first restoration test were washed with 1 mol/L of a hydrochloric acid (or sulfuric acid), and furthermore, washed with water. Subsequently, the standard solution was exchanged and 50 ml (milliliter) of a solution of which the concentration of fluoride ions was 50 mg/L was prepared as described above, and a restoration test was carried out on 200 mg of the above described samples which had been washed with water as described above. That is to say, the above described samples were put into the containers of 50 ml (milliliter) of the above described solution, and the containers were shaken for ten hours under the conditions of, for example, 200 rpm at 20° C., and after that, the concentration of fluoride ions in the above described solution was measured and the amount of adsorption was calculated, and in this manner, the second restoration test was carried out on the above described samples. This process was repeated two additional times.

[Results]

Amount of fluoride ions adsorbed by acid treated charcoal S was as follows:

| | |
|---|---|
| Initial time | 2.5 mg/g |
| First restoration time | 2.5 mg/g |
| Second restoration time | 2.4 mg/g |
| Third restoration time | 2.5 mg/g |

Amount of fluoride ions adsorbed by acid treated Ca charcoal 32

| | |
|---|---|
| Initial time | 18.7 mg/g |
| First restoration time | 18.2 mg/g |
| Second restoration time | 18.9 mg/g |
| Third restoration time | 18.6 mg/g |

It can be seen from the above that acid treated charcoal S and acid treated Ca charcoal 32 after use were respectively washed with a dense hydrochloric acid (or sulfuric acid), and furthermore, washed with water, and thereby, were restored. It was found that the acid treated charcoal S and the acid treated Ca charcoal 32 (anion adsorbing carbon material) which had adsorbed fluoride ions (anions) in the fluorine adsorbing test could be respectively washed with a hydrochloric acid (or sulfuric acid), and furthermore, washed with water, and thereby, the fluoride ions (anions) which had been adsorbed in the fluoride ion adsorbing test were removed and Cl— (or $SO_4^{2-}$—) was combined instead of the removed fluoride ions (anions), and thus, acid treated charcoal S and acid treated Ca charcoal 32 (anion adsorbing carbon material) were restored, respectively. Thus, it was confirmed that acid treated charcoal S and acid treated Ca charcoal 32 (anion adsorbing carbon material) which are once used can be washed with a hydrochloric acid (or sulfuric acid), and furthermore, washed with water, after each use, and thereby, can be used a number of times.

Figure 11:
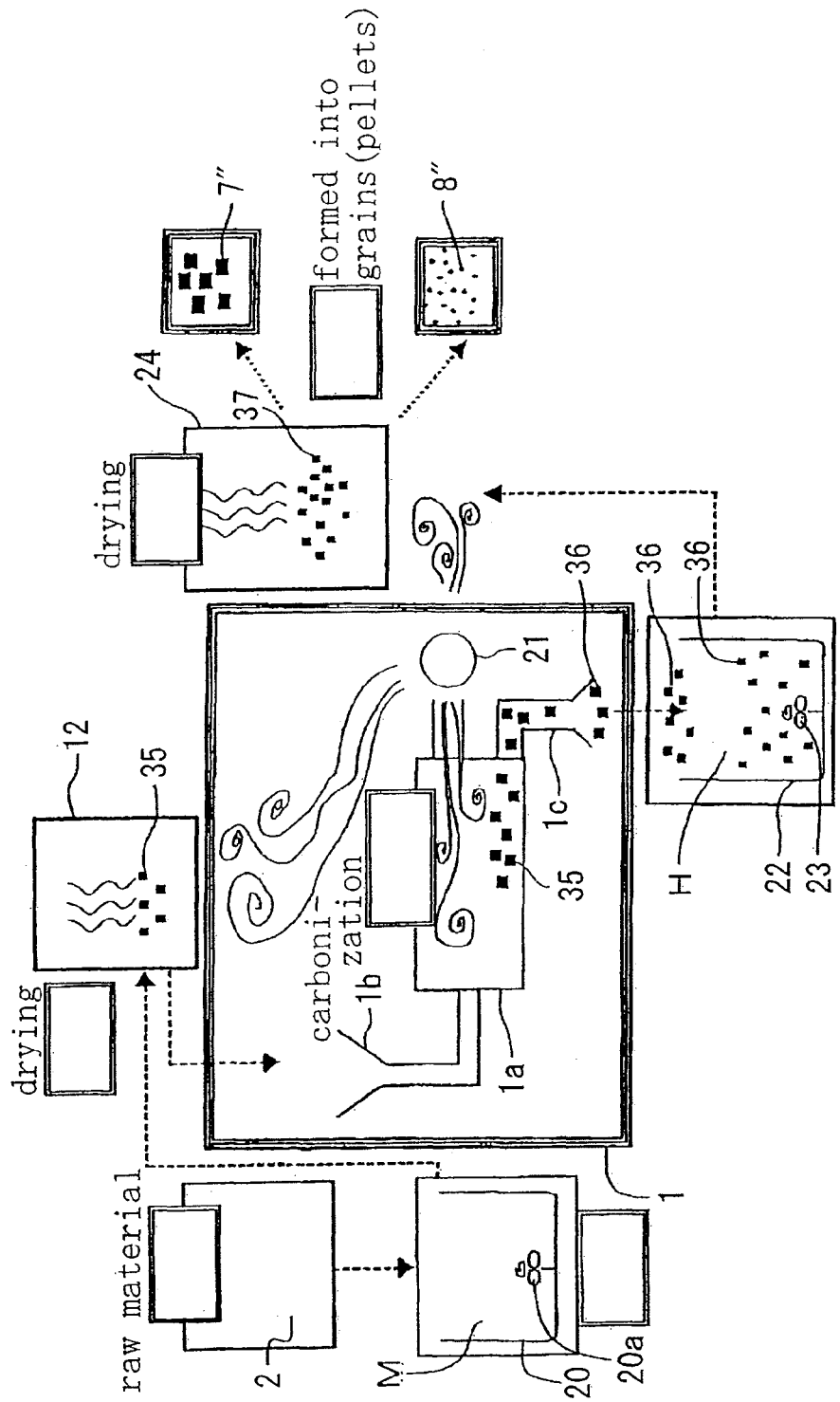
FIG. 11 is a diagram schematically showing the configuration of facilities for manufacturing an anion adsorbing carbon material according to a third embodiment of this invention.
Figure 12:
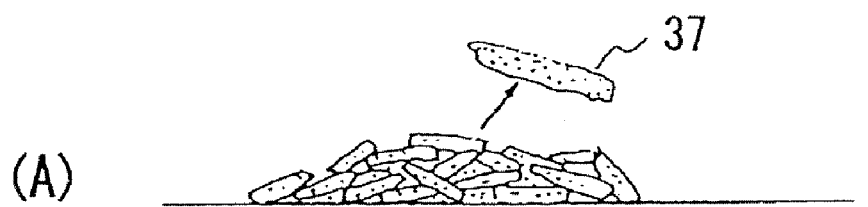
FIG. 12(A) is a diagram showing an example of an anion adsorbing carbon material.
FIG. 12(B) is a diagram showing an example of the above described anion adsorbing carbon material after processing.
Figure 12:
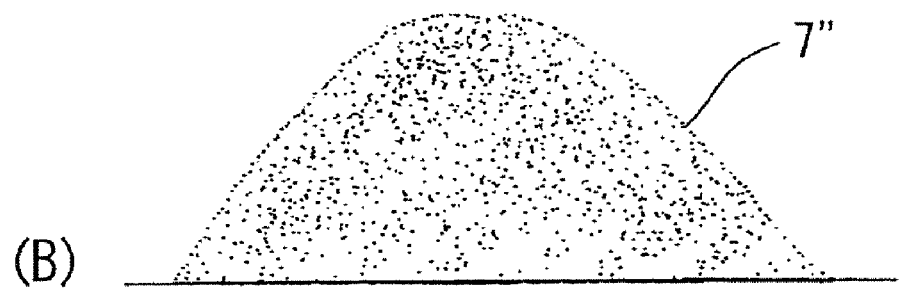

FIGS. 11 to 20 show a third embodiment of this invention. FIG. 11 schematically shows an example of facilities for manufacturing an anion adsorbing carbon material (hereinafter referred to as carbon material) 37 according to the third embodiment of this invention, and in this figure, 2 indicates a plant material which is ligneous chips in this embodiment. These ligneous chips 2 are gained by processing a conifer, such as Japanese cypress or cedar having high water absorbency and have an appropriate size of no greater than, for example, 50 mm.

In addition, the above described ligneous chips 2 are fed to a process tank 20 (apparatus for contacting a material with a solution including a metal chloride) which contain a metal chloride solution ($CaCl_2$ solution in this embodiment) M having an appropriate concentration, and within this process tank 20, a process for introducing a metal chloride ($CaCl_2$ in this embodiment) is carried out on ligneous chips 2 so that chips into which a metal chloride has been introduced (an example of an intermediate body) 35 are formed. Here, 20a indicates mixing blades which are provided within process tank 20 and are driven by a motor (not shown) so as to rotate, and thus, are used when stirring a liquid or the like within process tank 20. Here, it is preferable to add a slight amount of $Ca(OH)_2$ to the metal chloride solution in order to enhance the anion adsorbing ability.

Chips 35 into which a metal chloride has been introduced and which have been gained as described above are dried using a drier 12, and after that, fed to a carbonization process furnace 1 (carbonization apparatus) where a carbonization process is carried out on the chips without activation. Here, the above described drier 12 is an example of a drying area for drying chips 35 into which a metal chloride has been introduced and which are an intermediate body for gaining a carbon material 37, and is formed such that the heat discharged from carbonization process furnace 1 can be used for the above described drying.

The main body 1a of the carbonization furnace which is heated by an appropriate heat source 21 is contained inside the above described carbonization process furnace 1. In addition, chips 35 into which a metal chloride has been introduced are supplied to the inside of the above described main body 1a of the carbonization furnace through an introduction portion 1b, and are heated at an appropriate temperature (described below) and for an appropriate period of time (described below) so as to be carbonized and converted to a carbonized material, and this carbonized material is discharged to the outside of the main body 1a of the carbonization furnace through a discharging portion 1c as carbon material 36, which is an example of an intermediate body.

After that, the above described carbon material 36 is fed to a process tank 22 (apparatus for enhancing the anion adsorbing ability) which contains water or an HCl solution (hydrochloric acid) H, and a process for contacting (immersing) carbon material 36 with water or a HCl solution H is carried out within this process tank 22. Here, 23 indicates mixing blades which are provided within process tank 22, and are driven by a motor (not shown) so as to rotate, and thus, are used when stirring a liquid or the like within process tank 22. In some cases, a process for contacting a material with water is carried out after a process for contacting the material with an acid, or they may be carried out in the opposite order.

Next, carbon material (an example of an intermediate body) 37 which has been immersed in water or HCl solution H is fed to a drier 24 so as to be dried, and after that, are formed into grains (pellets) 7" having an appropriate diameter or further crushed into powder 8" which is finer than grains. Here, the above described drier 24 is an example of a drying area for drying carbon material 37 which is an intermediate body before being processed to pellets 7" or powder 8", and is formed so that the heat that is discharged from carbonization process furnace 1 is used for the above described drying.

FIG. 12(A) shows carbon material 37 which has been formed into chips having a length of approximately 10 mm and FIG. 12(B) shows an example of grains (pellets) 7" having an appropriate diameter which have been formed from the above described carbon material 37 in chip form.

Figure 13:
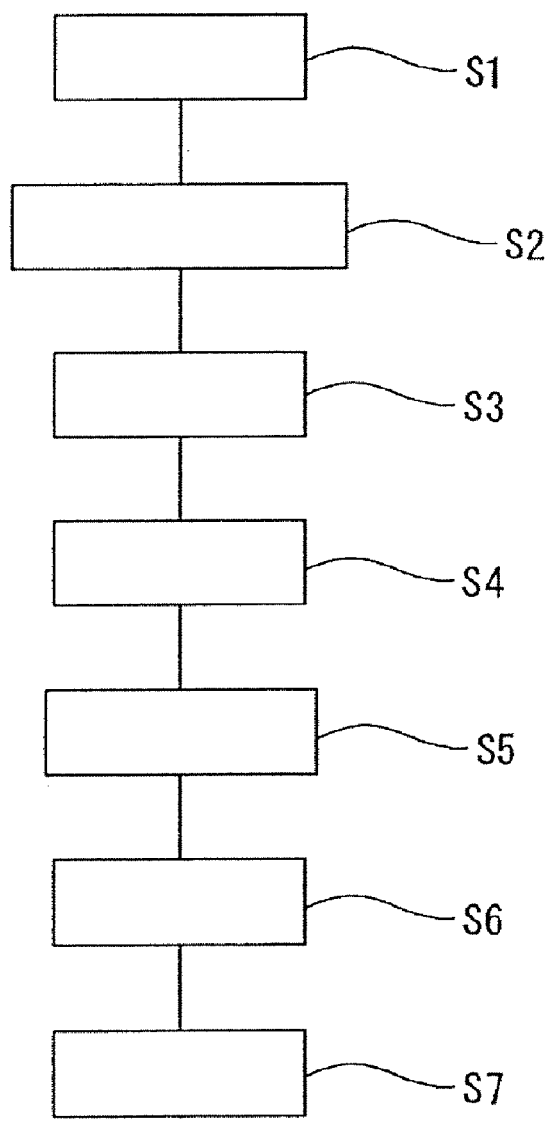
FIG. 13 is a diagram showing an example of process steps for manufacturing a carbon material as that described above using the above described manufacturing facilities.
Figure 14:
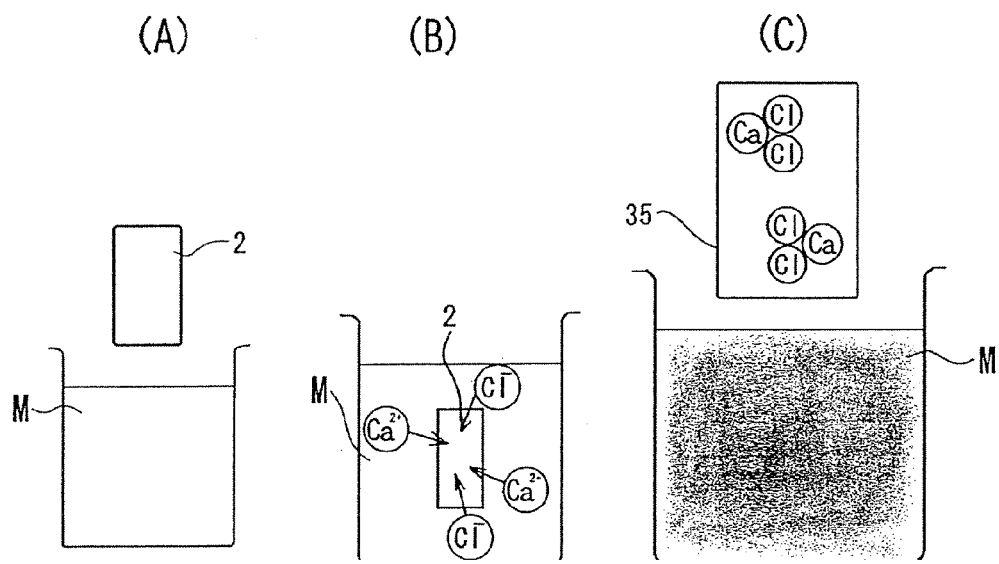
FIGS. 14(A) to 14(C) are diagrams showing a detail in Step S2 in FIG. 13.
Figure 15:
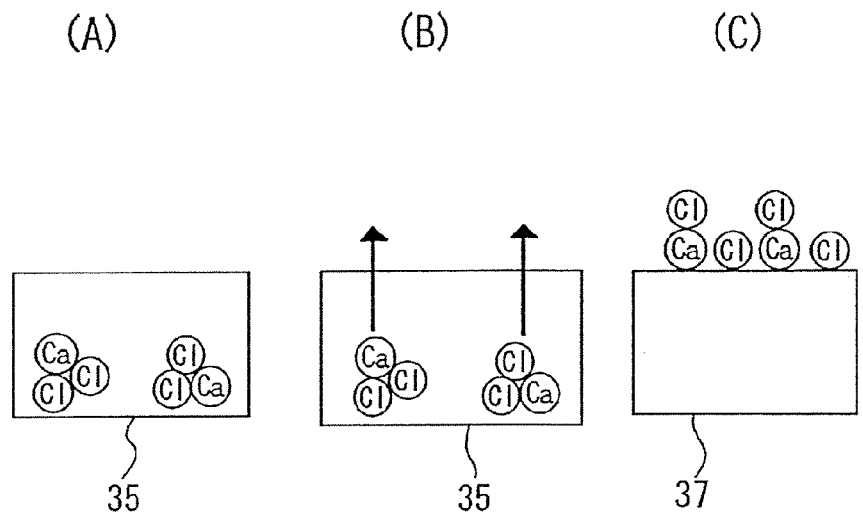
FIGS. 15(A) to 15(C) are diagrams showing a detail in Step S4 in FIG. 13.
Figure 16:
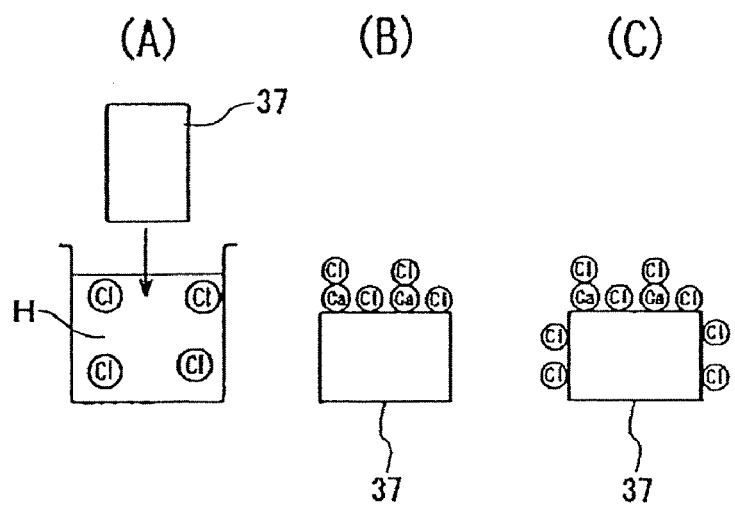
FIGS. 16(A) to 16(C) are diagrams showing a detail in Step S5 in FIG. 13.
Figure 17:
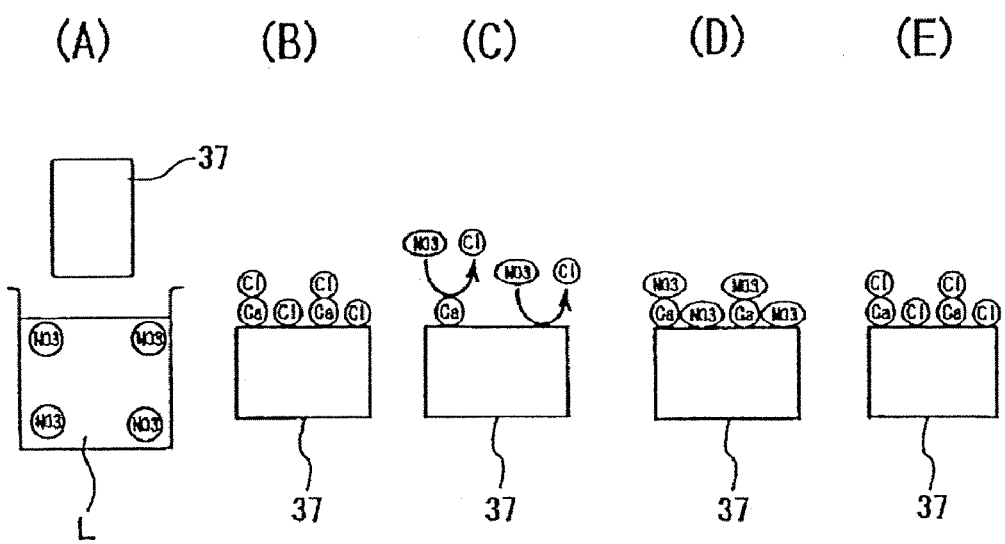
FIGS. 17(A) to 17(D) are diagrams showing a detail during adsorption of nitrate ions in the above described embodiment.
FIG. 17(E) is a diagram showing the carbon material after restoration.

Next, an example of a procedure for providing carbon material 37 from plant material 2 using the facilities shown in FIG. 11 is described in detail in reference to FIGS. 11 and 13. First, ligneous chips 2 which have been gained by processing a conifer, such as Japanese cypress or cedar having high water absorbency and have a size of no greater than, for example, 10 mm are prepared (Step S1).

Next, the above described ligneous chips 2 are immersed in $CaCl_2$ solution M which has been prepared so as to have 1 weight % to 20 weight % within process tank 20 for no less than, for example, three hours. It is preferable to rotate mixing blades 20a while these ligneous chips 2 are immersed. As a result, $CaCl_2$ solution M soaks into ligneous chips 2, and thus, chips 35 into which a metal chloride has been introduced, that is, ligneous chips 2 into which calcium ions and chloride ions have been introduced are gained (Step S2).

In addition, the above described chips 35 into which a metal chloride has been introduced are fed to drier 12 so as to be dried (Step S3).

After that, the above described ligneous chips 2 are supplied to main body 1a of the carbonization furnace in carbonation process furnace 1, and is heated for approximately one hour in a temperature range (700° C. in this embodiment) from 400° C. to 1000° C. so that a carbonization process is carried out (Step S4). As a result, the base intermediate carbon material 37 is produced.

The above described carbon material 37 is supplied to a process tank 22 and is immersed and processed in HCl solution H that has been prepared so as to have 0.01 mol/L to 11 mol/L (for example, 5 mol/L) within process tank 22 (Step S5). In this case, it is preferable to rotate mixing blades 23, and thereby, extra crystal of the metal chloride ($CaCl_2$) which remains within carbon material 37 can be removed and at the same time chloride ions can further be added, and thus, desired carbon material 37 is gained.

In addition, carbon material 37 after the above described immersion process is dried in general using drier 24 (Step S6). In this case, carbon material 37 may be directly fed to drier 24, or a neutralization process such as immersion in an appropriate alkaline solution may be carried out, and additionally, the carbon material may be washed with water after the neutralization process. Here, in the case where carbon material 37 is used in a moist state, it may not be dried.

In addition, though carbon material 37 in chip form after drying as described above can be used as is, the material has been formed into grains (pellets) 7" having an appropriate diameter or powder 8" which has finer particles using an appropriate processing machine in this embodiment (Step S7). In addition, it is possible to use the above described carbon material 37 in a state where, for example, it is stuck to an unwoven cloth in addition to being used as is.

Here, the above described carbon material 37 is not necessarily manufactured by carrying out all the above described Steps S1 to S7 within the same factory. In the case where several steps from among the above described Steps S1 to S7 have been carried out during the manufacture in another factory, or the like, carbon material 37 may be manufactured by starting from a step in the middle.

Here, this invention is not limited to any of the above described embodiments, and can be implemented by modifying in various manners. $BaCl_2$, $MnCl_2$, and the like, for example, can be cited as the metal chloride, though $CaCl_2$, which is believed to provide the anion adsorbing carbon material having the highest performance, is used in the above described embodiments.

In addition, in the above described embodiments, though a process for contacting carbon material 37 with HCl solution H is carried out within process tank 22, water may be used instead of HCl solution H. In this case, chloride ions are not added and extra crystals of a metal chloride which remain within carbon material 37 is simply removed.

Furthermore, in the above described embodiments, though carbon material 37 is fed to process tank 22 after it has been gained by carrying out a carbonization process on chips 35 into which a metal chloride has been introduced in the carbonization process furnace 1, it is not necessary to feed the carbon material to process tank 22. In this case, it becomes unnecessary to feed the above described carbon material 37 to drier 24, and therefore, the above described Steps S5 and S6 can be omitted from the manufacturing method for the carbon material 37. In addition, in this case the manufacturing method for carbon material 37 may be completed with Steps S1 to S4, or Step S7 may be carried out afterwards.

Next, a test that was carried out in order to check the performance of the above described carbon material 37 in adsorbing nitrate nitrogen and nitrite nitrogen is described. A test method and test results of the performance of adsorbing nitrate nitrogen and nitrite nitrogen are described in the following.

First, two sets of samples (1) to (7), each of which was 200 mg and of which the total number of samples in one set was 7 were prepared as shown in the following. That is to say, two sets of the following samples, of which the total number in one set was 7, were prepared:

(1) charcoal which was gained by heating and carbonizing ligneous chips 2 for 1 hour at 700° C., (2) iron chloride charcoal which was gained by heating and carbonizing ligneous chips 2 for 1 hour at 700° C., and after that immersing the chips in an $FeCl_3$ solution of 1 mol/L and then washing the chips with water, (3) an anion exchange resin, (4) $BaCl_2$ charcoal which was gained by immersing ligneous chips 2 in a $BaCl_2$ solution of 10 weight %, and after that, heating and carbonizing the chips for one hour at 700° C., (5) HCl processed $BaCl_2$ charcoal which was gained by immersing ligneous chips 2 in a $BaCl_2$ solution of 10 weight %, and after that, heating and carbonizing the chips for one hour at 700° C., and furthermore, immersing and processing the chips in an HCl solution of 5 mol/L, (6) $CaCl_2$ charcoal which was gained by immersing ligneous chips 2 in a $CaCl_2$ solution of 10 weight %, and after that, heating and carbonizing the chips for one hour at 700° C., and (7) HCl processed $CaCl_2$ charcoal which was gained by immersing ligneous chips 2 in a $CaCl_2$ solution of 10 weight %, and after that, heating and carbonizing the chips for one hour at 700° C., and furthermore, immersing and processing the chips in an HCl solution of 5 mol/L. Here, samples (4) to (7) corresponded to the above described carbon material 37 and samples (1) to (3) were provided for comparison with carbon material 37.

Then samples in one set were individually put into 50 mL of nitrate nitrogen solution (first standard liquid) of which the concentration of nitrate nitrogen was 50 mg/L (50 ppm) and samples in the other set were individually put into 50 mL of nitrite nitrogen solution (second standard liquid) of which the concentration of nitrite nitrogen was 50 mg/L (50 ppm). After that, the containers of the solutions were shaken for ten hours under the conditions of 200 rpm at 20° C., and then, the concentration of nitrate nitrogen in the first standard liquid and the concentration of nitrite nitrogen in the second standard liquid were respectively measured, and the amount of nitrate nitrogen and nitrite nitrogen which were adsorbed by each sample was calculated.

Figure 18:
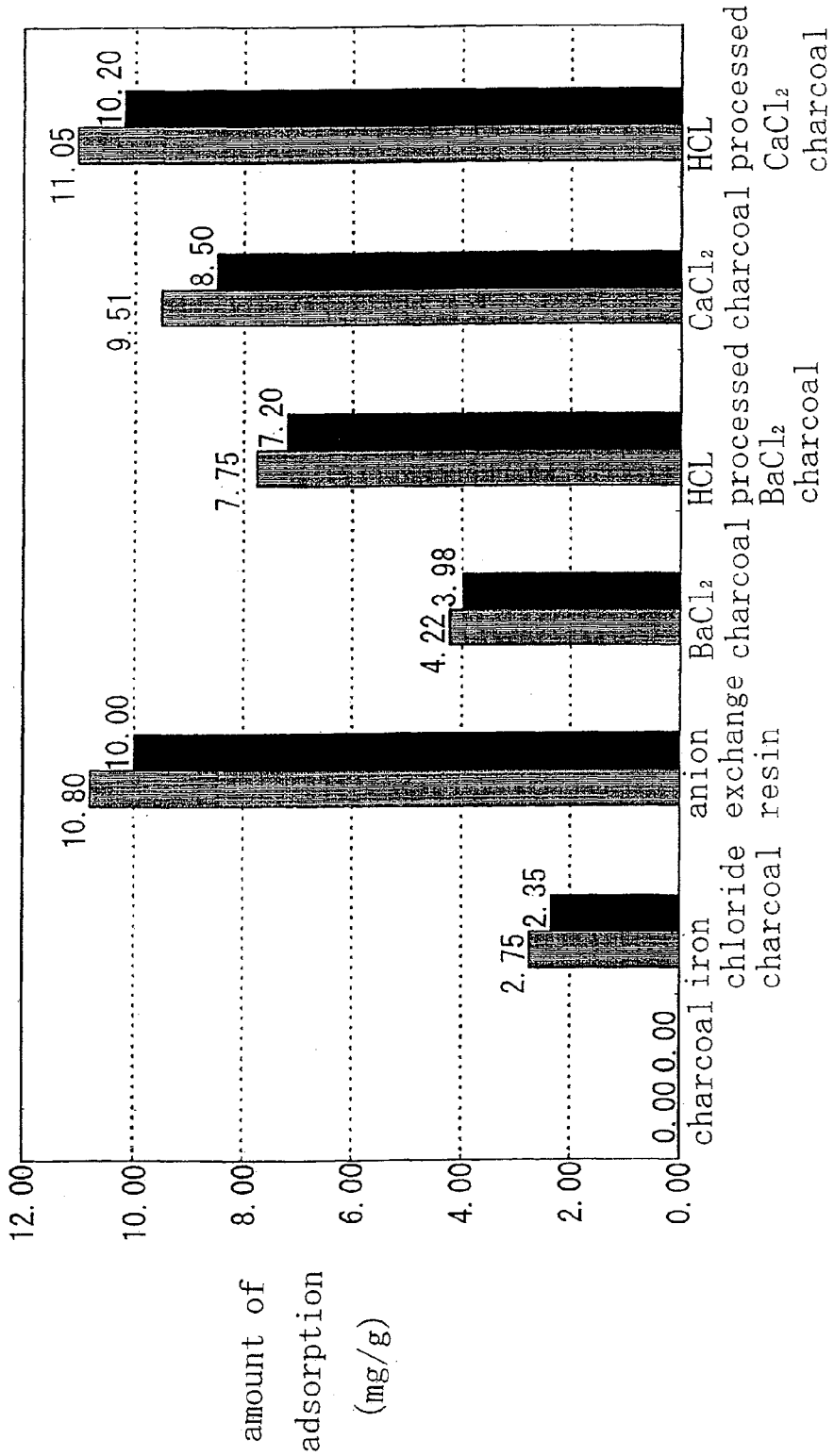
FIG. 18 is a graph showing the results of comparison of the adsorbed amount of nitrate nitrogen/nitrite nitrogen between the above described carbon material and a material for comparison.

FIG. 18 shows a comparison result in the nitrate nitrogen adsorbing ability and nitrite nitrogen adsorbing ability among the respective samples which were produced in the above described test. Here, FIG. 18 shows the amount of nitrate nitrogen and nitrite nitrogen adsorbed by each sample is shown in pairs of bars in a graph, where the bars on the left show the amount of adsorbed nitrate nitrogen and the bars on the right show the amount of adsorbed nitrite nitrogen. It can be seen from the results shown in this graph that all the samples of the present invention have high nitrate nitrogen adsorbing ability and nitrite nitrogen adsorbing ability. Furthermore, the amount of adsorbed nitrate nitrogen and nitrite nitrogen is compared between $BaCl_2$ charcoal of (4) and HCl processed $BaCl_2$ charcoal of (5) and the amount of adsorbed nitrate nitrogen and nitrite nitrogen is compared between $CaCl_2$ charcoal of (6) and HCl processed $CaCl_2$ charcoal of (7), and thereby, it can be seen that it is better to carry out a process (HCl process) for immersing carbon material 37 in an HCl solution in order to enhance the nitrate nitrogen/nitrite nitrogen adsorbing ability of carbon material 37. However, carbon material 37 having a sufficiently high nitrate nitrogen/nitrite nitrogen adsorbing ability can still be gained without carrying out an HCl process, and in this case, carbon material 37 can be manufactured at a cost which is lower by the portion for carrying out a process for contacting the material with an HCl solution.

Here, the above described carbon material 37 adsorbs, for example, nitrate ions, and this is considered to be because, as shown in FIG. 17(A), when carbon material ($CaCl_2$ charcoal) 37 is immersed in a nitrate solution L, chloride ions which has been combined with functional groups on the surface of carbon material 37 directly or via calcium ions (see FIG. 17(B)) and nitrate ions in nitrate solution L are exchanged (see FIG. 17(C)) so that nitrate ions are adsorbed by carbon material 37 (see FIG. 17(D)).

In addition, FIG. 17(E) shows a state of carbon material 37, which was initially in a state shown in FIG. 17(D) adsorbing nitrate ions, after being immersed in a chloride solution having a high concentration (for example, a metal chloride solution of KCl or NaCl, or HCl solution H). That is to say, the nitrate ions which have been adsorbed by carbon material 37 are exchanged with chloride ions in chloride solution, and thereby, carbon material 37 is restored and becomes a state where it can adsorb anions such as nitrate ions. That is to say, carbon material 37 of this invention is not always limited to those which are newly gained in accordance with the above described manufacturing method, but may be those which are gained (that is to say, restored) by removing the adsorbed anions (for example, nitrate ions) from carbon material 37 which has been produced in accordance with the above described manufacturing method and has adsorbed anions (nitrate ions) and combining anions (chloride ions in this embodiment) which can be ion exchanged with anions (for example, nitrate ions) of the next object of adsorption with the carbon material instead of the above described removed anion (nitrate ions). In addition, in the case where sulfuric acid is used instead of the above described chloride solution, nitrate ions are ion exchanged with sulfate ions instead of the above described chloride ions.

Next, a test carried out in order to check how the concentration of metal chloride solution (CaCl2 solution) M into which ligneous chips 2 are immersed in the above described Step S2 effects the anion absorbing ability of carbon material 37 after the manufacture is described. In the above described test, carbon material 37 which was gained by immersing ligneous chips 2 in $CaCl_2$ solution M, and after that carbonizing the chips by heating for one hour at 700° C., and then, washing the chips with water, was put into 50 mL of nitrate nitrogen solution (standard liquid) of which the concentration of nitrate nitrogen was 50 mg/L (50 ppm), and thus, the nitrate nitrogen adsorbing ability of the above described carbon material 37 was checked, where $CaCl_2$ solutions of which the concentrations were 1 weight %, 3 weight %, 5 weight %, 7 weight %, 10 weight %, 12 weight %, 14 weight %, 17 weight % and 20 weight % were used as the above described $CaCl_2$ solution M. Here, the amount of carbon material 37 which was added to each solution was 200 mg. In addition, for comparison, 200 mg of carbon material 37, which was gained by immersing ligneous chips 2 in 10 weight % of $CaCl_2$ solution M, and after that, heating and carbonizing the chips for one hour at 700° C., and then carrying out an HCl process, was used so that the nitrate nitrogen adsorbing ability thereof was checked. The results of the above described test are shown in FIG. 19.

Figure 19:
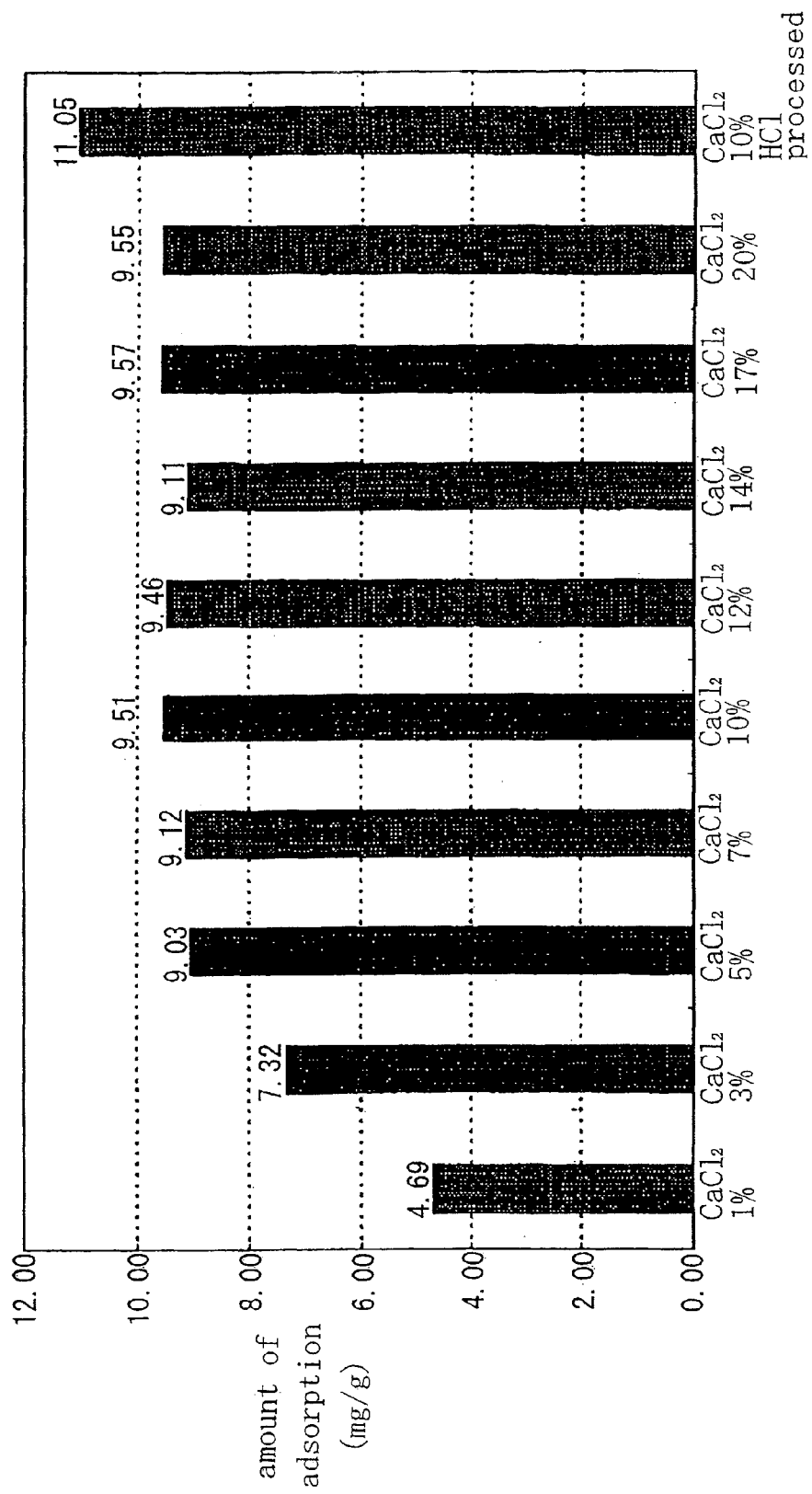
FIG. 19 is a graph respectively showing the amount of nitrate nitrogen adsorbed by a carbon material which has been prepared by changing the concentration of a $CaCl_2$ solution in Step S2 and by a carbon material gained through HCl treatment.

As is clear from the results shown in FIG. 19, the anion adsorbing ability of carbon material 37 does not increase in proportion to the concentration of the $CaCl_2$ solution, and it can be said that it is most preferable for the concentration to be approximately 10 weight % when taking cost and the like into consideration. In addition, it can be seen from the results shown in FIG. 19 that it is better to carry out an HCl process on carbon material 37 in order to enhance the anion adsorbing ability of carbon material 37.

Next, a restoration test, in which carbon material 37 that had been used to adsorb nitrate nitrogen was restored using a KCl (or NaCl) solution and which was carried out to check the nitrate nitrogen adsorbing ability of the restored carbon material 37, is described.

First, 200 mg of $CaCl_2$ charcoal, which had been gained by immersing ligneous chips 2 in a $CaCl_2$ solution of 10 weight %, and after that, heating and carbonizing the chips for one hour at 70° C., was prepared as carbon material 37. Then, this $CaCl_2$ charcoal was put in 50 mL of a nitrate nitrogen solution (standard liquid) of which the concentration of nitrate nitrogen was 50 mg/L (50 ppm), and the container was shaken for ten hours under the conditions of 200 rpm at 20° C., and after that, the concentration of the nitrate nitrogen in the above described standard liquid was measured and the amount of nitrate nitrogen adsorbed by the above described $CaCl_2$ charcoal was calculated (initial time).

Subsequently, the above described $CaCl_2$ charcoal was washed with a KCl (or NaCl) solution of 1 mol/L, and furthermore, it was washed with water and then restored. After that, the restored $CaCl_2$ charcoal was put in a newly prepared standard liquid (that is to say, 50 mL of a nitrate nitrogen solution of which the concentration of nitrate nitrogen was 50 mg/L), and the container was shaken for ten hours under the conditions of 200 rpm at 20° C., and after that, the concentration of nitrate nitrogen in the above described standard liquid was measured and the amount of nitrate nitrogen adsorbed by the above described $CaCl_2$ charcoal was calculated. In addition, the process, starting from the restoration of this $CaCl_2$ charcoal up to the calculation of the amount of nitrate nitrogen adsorbed by the $CaCl_2$ charcoal, was carried out three times in total (first restoration time to third time).

The results of the above described restoration test, that is to say, the amount of nitrate nitrogen adsorbed by the $CaCl_2$ charcoal, was as follows:

| Initial time | 9.5 mg/g |
|---|---|
| First restoration time | 9.0 mg/g |
| Second restoration time | 9.1 mg/g |
| Third restoration time | 8.8 mg/g |

It was confirmed from the above description that carbon material 37 ($CaCl_2$ charcoal), which had been used to adsorb nitrate nitrogen, was restored when washed with a dense KCl (or NaCl) solution, and furthermore, it was subsequently washed with water. This is considered to be because nitrate nitrogen was removed from the $CaCl_2$ charcoal when the $CaCl_2$ charcoal, which had adsorbed nitrate nitrogen, was washed with a KCl (or NaCl) solution, and furthermore, it was washed with water, and Cl— combined with the functional groups instead of the removed nitrate nitrogen. In addition, it was confirmed from the results of the above described restoration test that carbon material 37 ($CaCl_2$ charcoal) could be used a number of times to adsorb nitrate nitrogen in the case where the carbon material was restored by washing it with a KCl (or NaCl) solution, and then washing it with water. Here, the restoring principle is the same in the case where the above described carbon material 37 ($CaCl_2$ charcoal) is used to adsorb nitrite nitrogen.

Next, HCl processed $CaCl_2$ charcoal, which had been gained by immersing ligneous chips 2 in a $CaCl_2$ solution of 10 weight %, and after that, heating and carbonizing the chips for one hour at 700° C., and then, processing the chips through the immersion in an HCl solution of 5 mol/L, was used as carbon material 37, and the results of the restoration test, which was carried out in the same manner as described above on this HCl processed $CaCl_2$ charcoal, are shown as follows.

The results of the above described restoration test, that is to say, the amount of nitrate nitrogen adsorbed by the HCl processed $CaCl_2$ charcoal, was as follows:

| Initial time | 11.0 mg/g |
|---|---|
| First restoration time | 11.0 mg/g |
| Second restoration time | 10.8 mg/g |
| Third restoration time | 10.8 mg/g |

It was confirmed from the above description that carbon material 37 (HCl processed $CaCl_2$ charcoal), which was gained by processing the chips after carbonization through immersion in an HCl solution, was also restored by washing it with a dense KCl (or NaCl) solution, and furthermore, washing it with water after it was used to adsorb nitrate nitrogen. In addition, it was confirmed that the nitrate nitrogen adsorbing ability of the HCl processed $CaCl_2$ charcoal, which increased by processing the charcoal through immersion in an HCl solution, was maintained (kept increasing) even when the HCl processed $CaCl_2$ charcoal was repeatedly restored by washing it with a KCl (or NaCl) solution, and then washing it with water.

Next, the test which was carried out in order to check the fluoride ion adsorbing ability of the above described carbon material 37 is described. First, in order to carry out this test, one set of samples (1) to (7), which were the same as those used in the above described test of nitrate nitrogen and nitrite nitrogen adsorption ability, and of which the total number of samples was 7 with each having 50 mg, was prepared. Then, these samples were individually put into 50 mL of a solution (standard liquid) of which the concentration of fluoride ions was 50 mg/L (50 ppm), and the containers were shaken for ten hours under the conditions of 200 rpm at 20° C., and after that, each concentration of fluoride ions in the standard liquid was measured, and the amount of fluoride ions adsorbed by each sample was calculated.

Figure 20:
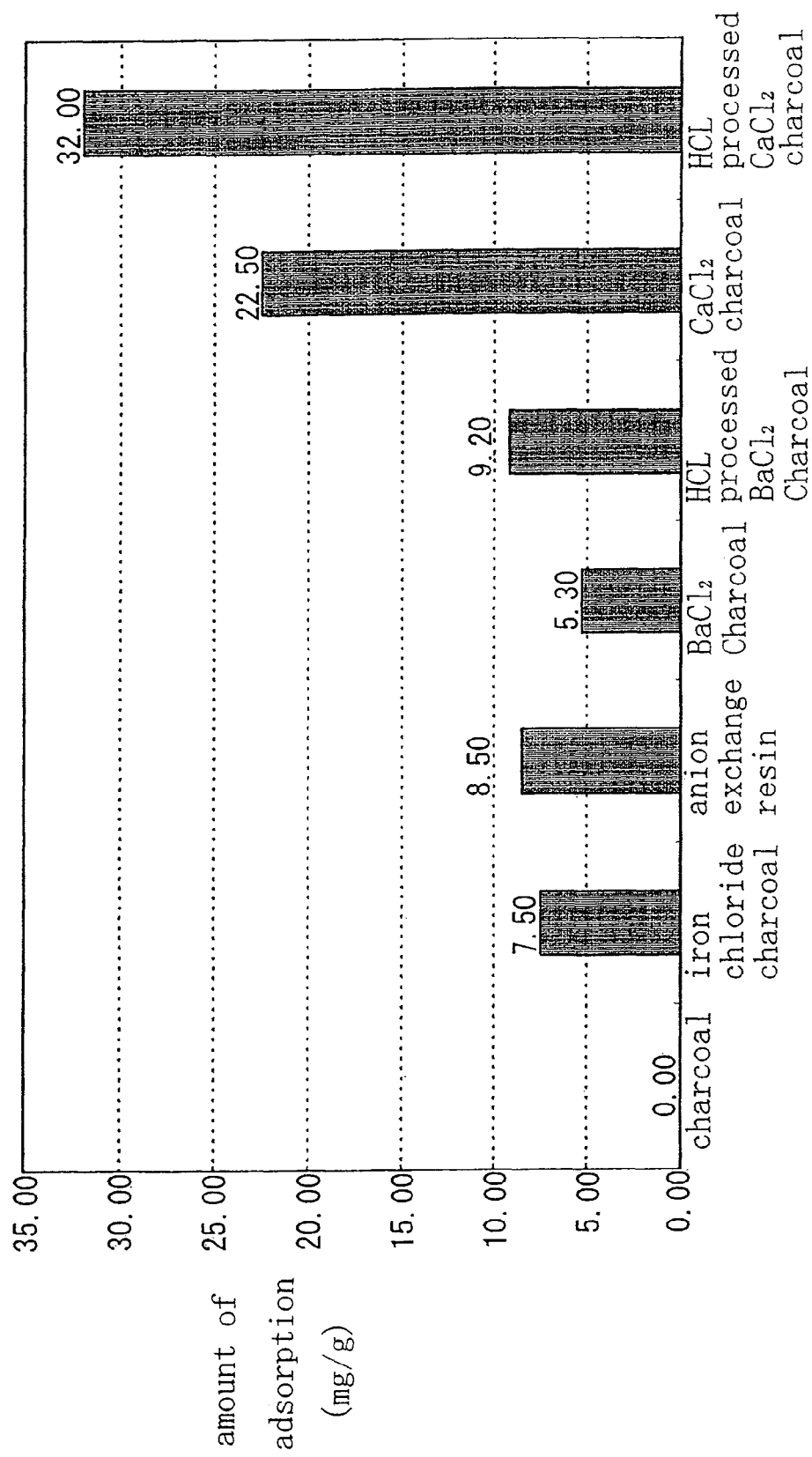
FIG. 20 is a graph showing the results of comparison of the adsorbed amount of fluoride ions between the above described carbon material and material for comparison.

FIG. 20 shows the results of a comparison of the fluoride ion adsorbing ability among the respective samples which were gained in the above described test. It can be seen from the results shown in this FIG. 20 that the samples of the present invention all had a high fluoride ion adsorbing ability. Furthermore, the amount of fluoride ions adsorbed by the $BaCl_2$ charcoal of (4) and the amount of fluoride ions adsorbed by the HCl processed $BaCl_2$ charcoal of (5) are compared, and in addition, the amount of fluoride ions adsorbed by the $CaCl_2$ charcoal of (6) and the amount of fluoride ions adsorbed by the HCl processed $CaCl_2$ charcoal of (7) are compared, and thereby, it can be seen that it is better to carry out a process (HCl process) of immersing carbon material 37 in an HCl solution in order to enhance the fluoride ion adsorbing ability of carbon material 37. However, carbon material 37, having a sufficiently high fluoride ion adsorbing ability, can be gained without carrying out an HCl process, and in this case, carbon material 37 can be manufactured at a cost that is lower by the portion for carrying out a process for contacting the carbon material with an HCl solution.

Next, a restoration test, in which carbon material 37 that had been used to adsorb fluoride ions was restored using a hydrochloric acid (or sulfuric acid) and which was carried out to check the fluoride ion adsorbing ability of the restored carbon material 37, is described.

First, 200 mg of $CaCl_2$ charcoal, which had been gained by immersing ligneous chips 2 in a $CaCl_2$ solution of 10 weight %, and after that, heating and carbonizing the chips for one hour at 700° C., was prepared as carbon material 37. Then, this $CaCl_2$ charcoal was put in 50 mL of a solution (standard liquid) of which the concentration of fluoride ions was 50 mg/L (50 ppm), and the container was shaken for ten hours under the conditions of 200 rpm at 20° C., and after that, the concentration of the fluoride ions in the above described standard liquid was measured and the amount of fluoride ions adsorbed by the above described $CaCl_2$ charcoal was calculated (initial time).

Subsequently, the above described $CaCl_2$ charcoal was washed with a hydrochloric acid (or sulfuric acid) of 1 mol/L, and furthermore, it was washed with water and then restored. After that, the restored $CaCl_2$ charcoal was put in a newly prepared standard liquid (that is to say, 50 mL of a solution of which the concentration of fluoride ions was 50 mg/L), and the container was shaken for ten hours under the conditions of 200 rpm at 20° C., and after that, the concentration of fluoride ions in the above described standard liquid was measured and the amount of fluoride ions adsorbed by the above described $CaCl_2$ charcoal was calculated. In addition, the process, starting from the restoration of this $CaCl_2$ charcoal up to the calculation of the amount of fluoride ions adsorbed by the $CaCl_2$ charcoal, was carried out three times in total (first restoration time to third time).

The results of the above described restoration test, that is to say, the amount of fluoride ions adsorbed by the $CaCl_2$ charcoal, was as follows:

| | |
|---|---|
| Initial time | 22.5 mg/g |
| First restoration time | 22.4 mg/g |
| Second restoration time | 21.7 mg/g |
| Third restoration time | 21.9 mg/g |

It was confirmed from the above description that carbon material 37 ($CaCl_2$ charcoal), which had been used to adsorb fluoride ions, was restored when washed with a dense hydrochloric acid (or sulfuric acid), and furthermore, it was washed with water. This is considered to be because fluoride ions were removed from the $CaCl_2$ charcoal when the $CaCl_2$ charcoal, which had adsorbed the fluoride ions, was washed with a hydrochloric acid (or sulfuric acid), and furthermore, it was washed with water, and Cl— (or $SO_4^{2-}$) combined with the functional groups instead of these removed fluoride ions. In addition, it was confirmed from the results of the above described restoration test that carbon material 37 ($CaCl_2$ charcoal) could be used a number of times to adsorb fluoride ions in the case where the carbon material was restored by washing it with a hydrochloric acid (or sulfuric acid), and then washing it with water.

Next, HCl processed $CaCl_2$ charcoal, which had been gained by immersing ligneous chips 2 in a $CaCl_2$ solution of 10 weight %, and after that, heating and carbonizing the chips for one hour at 700° C., and then, processing the chips through the immersion in an HCl solution of 5 mol/L, was used as carbon material 37, and the results of the restoration test, which was carried out in the same manner as described above on this HCl processed $CaCl_2$ charcoal, are shown as follows.

The results of the above described restoration test, that is to say, the amount of fluoride ions adsorbed by the HCl processed $CaCl_2$ charcoal, was as follows:

| | |
|---|---|
| Initial time | 32.0 mg/g |
| First restoration time | 31.5 mg/g |
| Second restoration time | 31.4 mg/g |
| Third restoration time | 31.2 mg/g |

It was confirmed from the above description that carbon material 37 (HCl processed $CaCl_2$ charcoal), which was gained by processing the chips after carbonization through immersion in an HCl solution, was also restored by washing it with a dense hydrochloric acid (or sulfuric acid) solution, and furthermore, washing it with water after it was used to adsorb fluoride ions. In addition, it was confirmed that the fluoride ion adsorbing ability of the HCl processed $CaCl_2$ charcoal, which increased by processing the charcoal through immersion in an HCl solution, was maintained (kept increasing) even when the HCl processed $CaCl_2$ charcoal was repeatedly restored by washing it with a hydrochloric acid (or sulfuric acid), and then washing it with water.

An anion adsorbing carbon material according to this invention adsorbs anions such as nitrate nitrogen, nitrite nitrogen and fluorine, and therefore, can be mainly used in the applications, for example, as follows:

(1) Purifier for Processing Sewage and Groundwater

Currently, most of the nitrate nitrogen components such as nitrite ions and nitrate ions as well as fluoride ions which exist in processed sewage water and groundwater are discharged without being treated. An anion adsorbing carbon material of this invention can be used as an inexpensive and effective purifier for processing sewage and groundwater. In a sewage treatment plant or a groundwater purifying plant, a purifier for processing sewage having an appropriate size, for example, is floated in the sewage or is contained in a cage having an appropriate mesh size or a mesh bag so as to be installed in a state of making sufficient contact with the water to be treated, and thereby, anions such as nitrite ions, nitrate ions and fluoride ions that are included in the water to be treated are adsorbed without fail. In addition, in the case where the purifier is in powder form, this may be stuck or embedded to an unwoven cloth.

(2) Purifier for Treating Discharged Wastewater

Currently, there are only a few inexpensive materials which adsorb anions such as nitrite ions and nitrate ions that are included in wastewater from chemical factories, oil purifying factories, steel and steel material manufacturing factories, paper manufacturing factories, semiconductor factories, industrial waste storage facilities, spinning factories in the fiber manufacturing industry and food processing factories, as well as fluoride ions that are included in wastewater from factories, residential wastewater of homes, combined treatment septic tanks and communities, and wastewater from the glass, plating, metal scouring, metal surface processing, and ceramics industries, electronic industries including semiconductors, chemical industries and the like. An anion adsorbing carbon material of this invention can be used as an inexpensive and effective purifier for processing discharged wastewater.

In a discharge wastewater path or within a tank for processing discharged wastewater from the residential wastewater of each home, a combined treatment septic tank, a community, or in a discharge wastewater path and within a tank for processing discharged wastewater where wastewater from livestock farms and various types of factories floats, a purifier for processing sewage having an appropriate size, for example, is floated in the discharged wastewater or is contained in a cage having an appropriate mesh size or a mesh bag so as to be installed in a state of making sufficient contact with the water to be treated, and thereby, anions such as nitrite ions, nitrate ions and fluoride ions that are included in the water to be treated are adsorbed without fail. In addition, in the case where the purifier is in powder form, this may be stuck to an unwoven cloth.

(3) Purifier for Tap Water

In recent years and in many regions, a severe groundwater contamination of nitrite ions and nitrate ions, which has been caused by discharged wastewater as described in (2) and a large amount of fertilizers used in tea fields, turfs for golfing and the like, as well as a large amount of excrement from livestock on farm grounds, has been observed, and thus, it has become necessary to remove nitrate nitrogen components from the collected water when the water is used as a water source for tap water, including water from rivers. An anion adsorbing carbon material of this invention can be used as an inexpensive and effective purifier for tap water.

In a facility for purifying tap water from a reservoir, within a facility for collecting river water and groundwater or within a home water purifier, a purifier for processing tap water having an appropriate size, for example, is floated in the tap water or is contained in a cage having an appropriate mesh size or a mesh bag so as to be installed in a state of making sufficient contact with the water to be treated, and thereby, anions such as nitrite ions, nitrate ions and fluoride ions that are included in the water to be treated are adsorbed without fail. In addition, in the case where the purifier is in powder form, this may be stuck to an unwoven cloth.

(4) Purifier for Farmlands

In many regions, a severe underground contamination of nitrite ions and nitrate ions, which has been caused by a large amount of fertilizers used in tea fields or a large amount of excrements from livestock on farms, has been observed. An anion adsorbing carbon material of this invention can be used as an inexpensive and effective purifier for farmlands.

A purifier for farmlands having an appropriate size for example, is mixed with the soil of farmlands or buried deep into the soil of farmlands, and thereby, nitrite ions and nitrate ions which originate from excessive fertilizers or excrements from livestock can be adsorbed, and thus, the amount of nitrite ions and nitrate ions which flow into underground water can be reduced. Furthermore, this purifier for farmlands is effective as a material for physically improving the soil, and in addition, the adsorbed nitrite ions and nitrate ions can be used by plants, and therefore, this purifier for farmlands functions as a fertilizer having gradual effects. Accordingly, the anion adsorbing carbon material of this invention, which has adsorbed nitrite ions and nitrate ions, can be used as a soil improving fertilizer.

(5) Purifier for Tank Water and Culture Ponds

In the tank water of a tank for breeding creatures (for example, a tank in an aquarium and a tank for a business or a home) where aquatic creatures and amphibians are bred as well as in a culture pond for fish or shrimps, excrements from the creatures and uneaten food generate ammonia, which is then oxidized so as to be converted to nitrite ions or nitrate ions, and when the concentration of these is high, poisoning symptoms may appear in the creatures that are being bred, though the toxicity thereof is gradually reduced. An anion adsorbing carbon material of this invention can be used as an inexpensive and effective purifier for tank water.

Within a water tank or a culture pond or within a purifier for the water in a water tank or a culture pond, a purifier for tank water and culture ponds having an appropriate size, for example, is floated in the water to be treated or is contained in a cage having an appropriate mesh size or a mesh bag so as to be installed in a state of making sufficient contact with the water to be treated, and thereby, anions such as nitrite ions, nitrate ions and fluoride ions that are included in the water to be treated are adsorbed without fail. In addition, in the case where the purifier is in powder form, this may be stuck to an unwoven cloth.

INDUSTRIAL APPLICABILITY

An anion adsorbing carbon material according to the present invention adsorbs nitrate nitrogen and nitrite nitrogen, and therefore, can be applied to purification of water, prevention of contamination caused by the livestock industry, and prevention of contamination caused by excessive fertilizing in agriculture. In addition, an anion adsorbing carbon material according to the present invention adsorbs fluorine, and therefore, can be applied in final treatment installations in semiconductor factories, glass factories, plating factories and the like, where cleaning is carried out using hydrofluoric acid.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

The invention claimed is:

1. A manufacturing method for an anion adsorbing carbonized plant material, comprising:
   providing a ligneous plant material with conductive tissue cut into sizes not greater than 50 mm;
   soaking and stirring the ligneous plant material in a liquid solution having 0.1 weight % to 7.0 weight % of a calcium chloride with individual diameter sizes not greater than 100 nm for a time period to introduce the calcium chloride into the conductive tissue of the ligneous plant material;
   removing the soaked ligneous plant material with the calcium chloride positioned within the conductive tissue;
   drying the soaked ligneous plant material;
   carbonizing the dried ligneous plant material with the calcium chloride in the conductive tissue at a temperature of 650° C. to 750° C. for a time period to enable carbonization of the dried ligneous plant material, with deposits of calcium chloride within 2 weight % to 25 weight % of the carbonized plant material; and
   applying a hydrochloric acid solution to the carbonized plant material to react with the calcium chloride, within a pressure range of 1330 Pa to 13.3 Pa, to remove extra crystals of $CaCl_2$ while leaving chloride ions in the carbonized plant material so that functional groups which have been drawn out from walls of micro pores in the carbonized plant material are combined with chloride ions to enable ion exchanging with nitrate nitrogen, nitrite nitrogen, and fluoride ions.

2. The manufacturing method of claim 1 where the concentration of the hydrochloric acid solution is within a range of 0.01 mol/L to 20 mol/L.

3. The manufacturing method of claim 1 further comprising drying the hydrochloric acid treated carbonized plant material and forming the dried material into one of grains and pellets.

* * * * *